United States Patent
Switkes et al.

(10) Patent No.: US 12,050,474 B2
(45) Date of Patent: Jul. 30, 2024

(54) SYSTEM AND METHOD FOR IMPLEMENTING PRECOGNITION BRAKING AND/OR AVOIDING OR MITIGATION RISKS AMONG PLATOONING VEHICLES

(71) Applicant: Peloton Technology, Inc., Mountain View, CA (US)

(72) Inventors: Joshua P. Switkes, Mountain View, CA (US); Stephen M. Erlien, Mountain View, CA (US); Lorenz Laubinger, San Francisco, CA (US)

(73) Assignee: Peloton Technology, Inc., Pacific Grove, CA (US)

( * ) Notice: Subject to any disclaimer, the term of this patent is extended or adjusted under 35 U.S.C. 154(b) by 160 days.

(21) Appl. No.: 17/713,192

(22) Filed: Apr. 4, 2022

(65) Prior Publication Data
US 2023/0054037 A1 Feb. 23, 2023

Related U.S. Application Data

(63) Continuation of application No. 15/926,805, filed on Mar. 20, 2018, now Pat. No. 11,294,396, which is a
(Continued)

(51) Int. Cl.
*B60W 30/165* (2020.01)
*B60W 10/04* (2006.01)
(Continued)

(52) U.S. Cl.
CPC .......... *G05D 1/0293* (2013.01); *B60W 10/04* (2013.01); *B60W 10/20* (2013.01); *B60W 30/165* (2013.01); *B62D 15/026* (2013.01); *G05D 1/0088* (2013.01); *G05D 1/0217* (2013.01); *G05D 1/0223* (2013.01); *G05D 1/0295* (2013.01); *G08G 1/163* (2013.01); *G08G 1/164* (2013.01); *G08G 1/165* (2013.01); *G08G 1/166* (2013.01); *G08G 1/22* (2013.01); *H04L 67/12* (2013.01); *H04L 67/125* (2013.01); *B60W 2554/801* (2020.02); *B60W 2710/18* (2013.01); *B60W 2710/20* (2013.01); *B60W 2720/10* (2013.01); *H04W 84/005* (2013.01)

(58) Field of Classification Search
None
See application file for complete search history.

(56) References Cited

U.S. PATENT DOCUMENTS 9,632,507 B1 * 4/2017 Korn .................. G08G 1/22
11,084,418 B2 * 8/2021 Hong .................. H04W 4/40
(Continued)

*Primary Examiner* — Jonathan M Dager
(74) *Attorney, Agent, or Firm* — Redbrick IP, P.C.

(57) ABSTRACT

A system and method for mitigating or avoiding risks due to hazards encountered by platooning vehicles. The system and method involve interrogating, with one or more sensors, a space radially extending from a lead vehicle as the lead vehicle travels over the road surface, perceiving the environment within the space, ascertaining a hazard caused by an object in the space, and causing a following vehicle, operating in a platoon with the lead vehicle, to take a preemptive braking action to avoid or mitigate risks resulting from the hazard caused by the object in the space.

18 Claims, 14 Drawing Sheets

Related U.S. Application Data continuation-in-part of application No. 15/607,902, filed on May 30, 2017, now Pat. No. 10,254,764, and a continuation-in-part of application No. 15/589,124, filed on May 8, 2017, now Pat. No. 10,481,614, which is a continuation of application No. 14/855,044, filed as application No. PCT/US2014/030770 on Mar. 17, 2014, now Pat. No. 9,645,579.

(60) Provisional application No. 62/638,794, filed on Mar. 5, 2018, provisional application No. 62/377,970, filed on Aug. 22, 2016, provisional application No. 62/363,192, filed on Jul. 15, 2016, provisional application No. 62/343,819, filed on May 31, 2016, provisional application No. 61/792,304, filed on Mar. 15, 2013.

(51) Int. Cl.
| | | |
|---|---|---|
| *B60W 10/20* | (2006.01) | |
| *B62D 15/02* | (2006.01) | |
| *G05D 1/00* | (2006.01) | |
| *G08G 1/00* | (2006.01) | |
| *G08G 1/16* | (2006.01) | |
| *H04L 67/12* | (2022.01) | |
| *H04L 67/125* | (2022.01) | |
| *H04W 84/00* | (2009.01) | |

(56) References Cited

U.S. PATENT DOCUMENTS

| | | | |
|---|---|---|---|
| 2014/0316865 A1* | 10/2014 | Okamoto | G05D 1/0293 |
| | | | 705/14.1 |
| 2016/0026187 A1* | 1/2016 | Alam | G08G 1/22 |
| | | | 701/23 |
| 2018/0082591 A1* | 3/2018 | Pandy | B60W 40/08 |
| 2018/0120861 A1* | 5/2018 | Saxena | G05D 1/0291 |
| 2018/0137763 A1* | 5/2018 | Deragården | G05D 1/0278 |
| 2018/0188746 A1* | 7/2018 | Lesher | G08G 1/22 |
| 2018/0211546 A1* | 7/2018 | Smartt | H04W 4/38 |
| 2019/0025857 A1* | 1/2019 | Luckevich | G01S 13/931 |
| 2020/0057453 A1* | 2/2020 | Laws | G05D 1/0295 |
| 2020/0193837 A1* | 6/2020 | Grolle | B60Q 1/543 |
| 2020/0298882 A1* | 9/2020 | Kobayashi | B60W 40/04 |
| 2020/0301444 A1* | 9/2020 | Sujan | B60W 30/162 |

* cited by examiner

HAZARD LEVELS/ACTIONS

| LEVEL | ALERTS/WARNINGS | SAFETY PREPARATIONS | SPECIFIC ACTIONS |
|---|---|---|---|
| PRE-WARNING | ✓ | | |
| MODERATE | | | ✓ |
| HIGH | | ✓ | ✓ |
| EMERGENCY | ✓ | ✓ | ✓ |

FIG. 11

ALERTS/WARNINGS

```
FLASH HAZARD LIGHT
HORN
AUDIO WARNINGS
VISUAL WARNINGS
RADIO HAPTIC SENSORS
```

PREPARATIONS

```
PREPARE BRAKES
SEAT BELT PRE-TENSIONS
OTHERS?
```

ACTIONS

```
BRAKING
STEERING
RETARDER (ENGINE BRAKING)
TRANSMISSION/GEAR SHIFT
THROTTLE/TORQUE RESPONSE
ADJUST SPOILER
DIFFERENTIAL STEERING
```

FIG. 12

SYSTEM AND METHOD FOR IMPLEMENTING PRECOGNITION BRAKING AND/OR AVOIDING OR MITIGATION RISKS AMONG PLATOONING VEHICLES

CROSS-REFERENCE TO RELATED APPLICATIONS

This application is a Continuation of U.S. application Ser. No. 15/926,805, filed on Mar. 20, 2018; which claims priority of U.S. Provisional Application No. 62/638,794, filed on Mar. 5, 2018. U.S. application Ser. No. 15/926,805 is a Continuation-in-Part of U.S. application Ser. No. 15/589,124, filed on May 8, 2017, which is a Continuation of U.S. application Ser. No. 14/855,044, filed Sep. 15, 2015 (now U.S. Pat. No. 9,645,579, issued May 9, 2017), which is a 371 of International Application No. PCT/US2014/030770, filed on Mar. 17, 2014, which claims priority of U.S. Provisional Application No. 61/792,304, filed Mar. 15, 2013. U.S. application Ser. No. 15/926,805 is a Continuation-in-Part of U.S. application Ser. No. 15/607,902, filed on May 30, 2017 which claims priority of U.S. Provisional Application Nos.: 62/343,819, filed May 31, 2016; 62/363,192, filed Jul. 15, 2016; and 62/377,970, filed on Aug. 22, 2016. All of the aforementioned priority applications are incorporated herein by reference in their entirety for all purposes.

BACKGROUND

The present application relates generally to controllers, architectures, methods and systems for enabling vehicles to closely follow one another safely using automatic or partially automatic control, and more particularly, to a system and method for mitigating or avoiding risks due to hazards encountered by connected vehicles operating in a platoon.

In recent years significant strides have been made in the field of automated vehicle control. One segment of vehicle automation relates to vehicular convoying systems that enable vehicles to follow closely together in a safe, efficient and convenient manner Following closely behind another vehicle has the potential for significant fuel savings benefits, but is generally unsafe when done manually by the driver. Known vehicle convoying systems, often interchangeable referred to as "platooning" or "connected vehicles", calls for one or more following vehicle(s) closely following a lead vehicle in an automatic or semi-automatically controlled manner.

The fuel efficiency advantages of platooning connected vehicles is particularly noticeable in fields such as the trucking industry in which long distances tend to be traveled at highway speeds. One of the on-going challenges of vehicle platooning and convoying systems is creating controller systems architectures that effectively maintain a gap between vehicles while meeting stringent safety standards as required for integration of connected vehicles into mainstream road vehicles.

Maintaining road safety and avoiding collisions due to hazards encountered on the road is also very important with platooning. Although the platooning of connected vehicles has a very good safety record, there is always a need for improvement.

A system and method for mitigating or avoiding risks due to hazards encountered by platooning vehicles is therefore needed.

SUMMARY

A system and method for mitigating or avoiding risks due to hazards encountered by connected vehicles operating in a platoon is described. The system and method involve operating a following vehicle in a platoon behind a lead vehicle, receiving data generated by one or more sensors arranged to interrogate a space radially extending from the lead vehicle as the lead vehicle travels over the road surface, ascertaining a hazard caused by an object in the space, and causing the following vehicle to take a preemptive action to avoid or mitigate the hazard caused by the object in the space, the preemptive action taken by the following vehicle prior to the lead vehicle taking any action in response to the hazard caused by the object.

In one non-exclusive embodiment, a plurality of tiered severity threat levels is defined, each level having one or more corresponding preemptive action(s) respectively. When a threat is perceived, one of the tiered severity threat levels commensurate with the threat is selected. The corresponding one or more preemptive action(s) is/are then implemented by the following vehicle to mitigate or avoid the risks associated with the object. In one particular non-exclusive embodiment, the tiered threat levels include low, moderate, high and emergency.

In yet another non-exclusive embodiment, one of the preemptive actions may involve increasing the gap between the two vehicles by decreasing the relative velocity of the following vehicle(s) prior to taking any preemptive action by the lead vehicle. By reducing the relative velocity of the following vehicle first, the gap between the vehicles will grow.

In yet other alternative embodiments, the gap can be increase while either maintaining or dissolving the platoon. In either case, a normal operating gap may be reestablished once the perceived threat has passed.

In yet another embodiment, raw data collected by the one or more sensors, on the lead vehicle, is transmitted by the lead vehicle to the following vehicle. In response, the following vehicle is responsible for perceiving the environment within the space radially extending from the lead vehicle, ascertaining the hazard caused by the object in the space, and taking a preemptive action prior to and/or without waiting for the lead vehicle taking any preemptive action.

In an alternative to the above embodiment, the lead vehicle is responsible for perceiving the environment in the space, ascertaining the hazard level, and then transmitting one or more coded commands, each indicative or a preemptive action, to the following vehicle. In response, the following vehicle interprets the commands and implements the preemptive action(s) prior to the lead vehicle taking any preemptive action.

In yet other embodiments, pre-cognitive braking is implemented with platooning vehicles. A notice is sent to the following vehicle by the lead vehicle in response to a braking event by the lead vehicle. In response to the notice, the following vehicle initiates a braking before the lead vehicle, resulting in an increase of a gap maintained between the two vehicles.

In yet other embodiments, a system operating onboard a vehicle is configured to receive data from one or more sensors external to the vehicle that are arranged to sense a driving condition in the vicinity of the vehicle. In response, the system is arranged to make a decision or take an action at least in part based on the received data.

BRIEF DESCRIPTION OF THE DRAWINGS

The invention and the advantages thereof, may best be understood by reference to the following description taken in conjunction with the accompanying drawings in which:

FIG. 11 illustrates an illustrative plurality of tiered severity threat levels each having one or more corresponding preemptive action(s) in accordance with a non-exclusive embodiment of the present invention.

FIG. 12 illustrates several categories of preemptive actions in accordance with a non-exclusive embodiment of the present invention.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some case, one or more alternatives. It will be apparent to those skilled in the art that the invention can be practice without implementing all of the features disclosed herein.

Platooning

The Applicant has proposed various vehicle platooning systems in which a second, and potentially additional, vehicle(s) is/are automatically, or semi-automatically controlled to closely follow a lead vehicle in a safe manner By way of example, U.S. application Ser. Nos. 15/605,456, 15/607,902; 13/542,622 and 13/542,627; U.S. Provisional Application Nos. 62/377,970 and 62/343,819; and PCT Application Nos. PCT/US2014/030770, PCT/US2016/049143 and PCT/US2016/060167 describe various vehicle platooning systems in which a trailing vehicle is at least partially automatically controlled to closely follow a designated lead vehicle. Each of these earlier applications is incorporated herein by reference.

One of the goals of platooning is typically to maintain a desired longitudinal distance between the platooning vehicles, which is frequently referred to herein as the "desired gap". That is, it is desirable for the trailing vehicle (e.g., a trailing truck) to maintain a designated gap relative to a specific vehicle (e.g., a lead truck). The vehicles involved in a platoon will typically have sophisticated control systems suitable for initiating a platoon, maintaining the gap under a wide variety of different driving conditions, and gracefully dissolving the platoon as appropriate.

Figure 1:
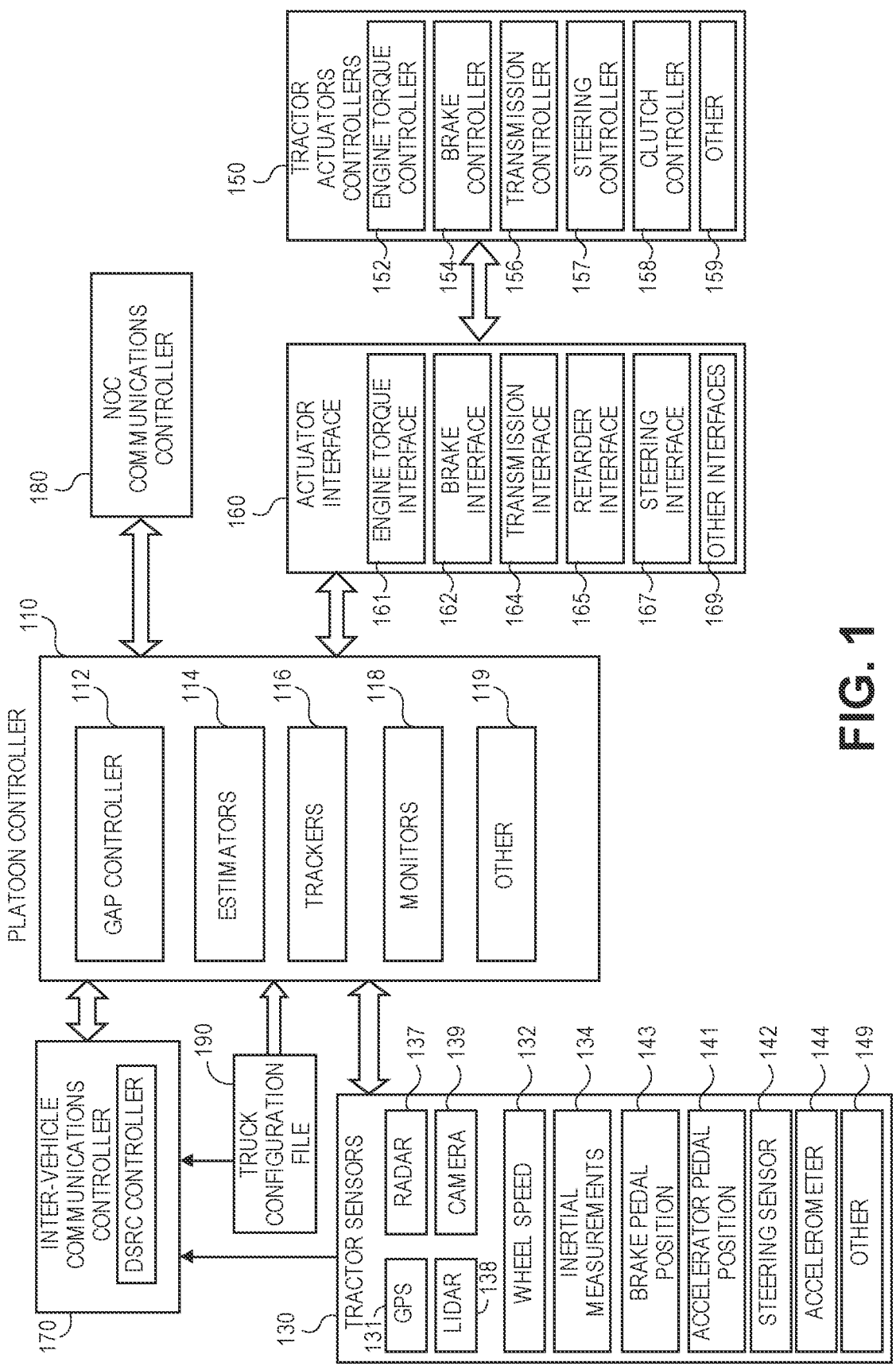
FIG. 1 is a block diagram of a controller architecture suitable for use in an automated or partially automated vehicle control system that supports platooning.

The architecture and design of control systems suitable for implementing vehicle platooning may vary widely. The specific controller design can vary based on the level of automation contemplated for the controller, as well as the nature of and equipment available on the host vehicles participating in the platoon. By way of example, FIG. 1 diagrammatically illustrates a vehicle control architecture that is suitable for use with platooning tractor-trailer trucks. The specific controller illustrated is primarily designed for use in conjunction with a platooning system in which both vehicles include an active driver. The driver of the lead vehicle being fully responsible for control of the front vehicle. The a driver of the trailing vehicle is responsible for steering the trailing vehicle, but the platoon controller 110 is primarily responsible for controlling the engine torque and braking requests of the following vehicle during active platooning. However, it should be appreciated that generally similar control schemes can be used in systems which contemplate more automated control of one or both of the platoon partners.

In the illustrated embodiment illustrated in FIG. 1, a platoon controller 110, receives inputs from a number of sensors 130 on the tractor and/or one or more trailers or other connected units, and a number of actuators and actuator controllers 150 arranged to control operation of the tractor's powertrain and other vehicle systems. An actuator interface 160 may be provided to facilitate communications between the platoon controller 110 and the actuator controllers 150.

The platoon controller 110 also interacts with an inter-vehicle communications controller 170 which orchestrates communications with the platoon partner and a Network Operations Center (NOC) communications controller 180 that orchestrates communications with a NOC. The vehicle also preferably has selected configuration files 190 that include known information about the vehicle.

Some of the functional components of the platoon controller 110 include gap controller 112, a variety of estimators 114, one or more partner vehicle trackers 116 and various monitors 118. In many applications, the platoon controller 110 will include a variety of other components 119 as well. Exemplary embodiments of the platoon controller 110 and gap controller 112 are described in more detail below with reference to FIGS. 2 and 3.

Some of the sensors utilized by the platoon controller 110 may include GNSS (GPS) unit 131, wheel speed sensors 132, inertial measurement devices 134, radar unit 137, LIDAR unit 138, cameras 139, accelerator pedal position sensor 141, steering wheel position sensor 142, brake pedal position sensor 143, and various accelerometers 144. Of course, not all of these sensors will be available on all vehicles involved in a platoon and not all of these sensors are required in any particular embodiment. A variety of other sensor 149 (now existing or later developed or commercially deployed) may be additionally or alternatively be utilized by the platoon controller in other embodiments. In the primary embodiments described herein, GPS position data is used. However, GPS is just one of the currently available global navigation satellite systems (GNSS). Therefore, it should be appreciated that data from any other GNSS system or from other suitable position sensing systems may be used in place of, or in addition to, the GPS system.

Many (but not all) of the described sensors, including wheel speed sensors, 132, radar unit 137, accelerator pedal position sensor 141, steering wheel position sensor 142, brake pedal position sensor 143, and accelerometer 144 are relatively standard equipment on newer trucks (tractors) used to pull semi-trailers. However, others, such as the GNSS unit 131 and LIDAR unit 138 (if used) are not currently standard equipment on such tractors or may not be present on a particular vehicle and may be installed as needed or desired to help support platooning.

Some of the vehicle actuators controllers 150 that the platoon controller may direct at least in part include engine torque controller 152 (which is often part of the integrated functionality of an engine control unit (ECU) or powertrain control module (PCM)), transmission controller 154, brake controller 156, steering controller 157 (when automated steering is provided); and clutch controller 158. Of course, not all of these actuator controllers will be available or are required in any particular embodiment and it may be desirable to interface with a variety of other vehicle actuator controllers 159 that may be available on the controlled vehicle as well. Therefore, it should be appreciated that the specific actuator controllers 150 directed or otherwise utilized by the platoon controller on any particular controlled vehicle may vary widely. Further, the capabilities of any particular actuator controller (e.g. engine torque controller 152), as well as its interface (e.g., the nature and format of the commands, instructions, requests and messages it can handle or generate) will often vary with the make and model of that particular actuator controller. Therefore, an actuator interface 160 is preferably provided to translate requests, commands, messages and instructions from the platoon controller 110 into formats that are appropriate for the specific actuator controller hardware and software utilized on the controlled vehicle. The actuator interface 160 also provides a mechanism for communicating/translating messages, commands, instructions and requests received from the various actuator controllers back to the platoon controller 110. Typically an appropriate actuator interface would be provided to interact with each of the specific vehicle controllers utilized. In various embodiments, this may include one or more of an engine torque interface 161, a brake interface 162, a transmission interface 164, a retarder interface 165 (if a separate retarder controller is used), a steering interface 167, and/or any other appropriate controller interface 169.

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder will be controlled by the engine torque controller 152 and in such embodiments, the retarder can be controlled by sending appropriate torque commands (which may be negative) to the engine torque controller 152. In other embodiments a separate retarder controller (not shown) may be accessible to, and therefore directed by, platoon controller 110 through an appropriate retarder interface 165. In still other embodiments, the platoon controller 110 may separately determine a retard command that it sends to the actuator interface 160. In such embodiments the actuator interface will interpret the retard command and pass on appropriate retardation control commands to the ECU or other appropriate vehicle controller.

The communications between vehicles may be directed over any suitable channel and may be coordinated by inter-vehicle communications controller 170. By way of example, the Dedicated Short Range Communications (DSRC) protocol (e.g. the IEEE 802.11p protocol), which is a two-way short to medium range wireless communications technology that has been developed for vehicle to vehicle communications, works well. Of course other communications protocols and channels may be used in addition to or in place of a DSRC link. For example, the inter vehicle communications may additionally or alternatively be transmitted over a cellular communications channel such as 4G LTE Direct, 5G, a Citizen's Band (CB) Radio channel, one or more General Mobile Radio Service (GMRS) bands, and one or more Family Radio Service (FRS) bands or any other now existing or later developed communications channels using any suitable communication protocol.

In various embodiments, the transmitted information may include the current commands generated by the platoon controller 110 such as requested/commanded engine torque 280, requested/commanded braking deceleration 282. They may also include steering commands, gear commands, etc. when those aspects are controlled by platoon controller 110. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 110 is also transmitted to the platoon partner and corresponding information is received from the platoon partner so that the platoon controllers 110 on each vehicle can develop an accurate model of what the partner vehicle is doing. The same is true for any other relevant information that is provided to the platoon controller, including any vehicle configuration information 190 that is relevant to the platoon controller. It should be appreciated that the specific information transmitted may vary widely based on the requirements of the platoon controllers 110, the sensors and actuators available on the respective vehicles, and the specific knowledge that each vehicle may have about itself.

The information transmitted between vehicles may also include information about intended future actions. For example, if the lead vehicle knows it approaching a hill, it may expect to increase its torque request (or decrease its torque request in the context of a downhill) in the near future and that information can be conveyed to a trailing vehicle for use as appropriate by the platoon controller 110. Of course, there is a wide variety of other information that can be used to foresee future torque or braking requests and that information can be conveyed in a variety of different forms. In some embodiments, the nature of the expected events themselves can be indicated (e.g., a hill, or curve or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as the cellular network, various Wi-Fi networks, satellite communications networks and/or any of a variety of other networks as appropriate. The communications with the NOC may be coordinated by NOC communications controller 180. The information transmitted to and/or received from the NOC may vary widely based on the overall system design. In some circumstances, the NOC may provide specific control parameters such as a target gap tolerance. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to the platoon controller. The NOC may also provide information about the partner vehicle including its configuration information and any known relevant information about its current operational state such as weight, trailer length, etc.

The configuration file 190 may include a wide variety of information about the host vehicle that may be considered relevant to the controller. By way of example, some of the information might include the vehicle's specification including such things as engine performance characteristics, available sensors, the nature of its braking system, the location of its GNSS antenna relative to the front of the cab, gear ratios, differential ratios etc.

Figure 2:
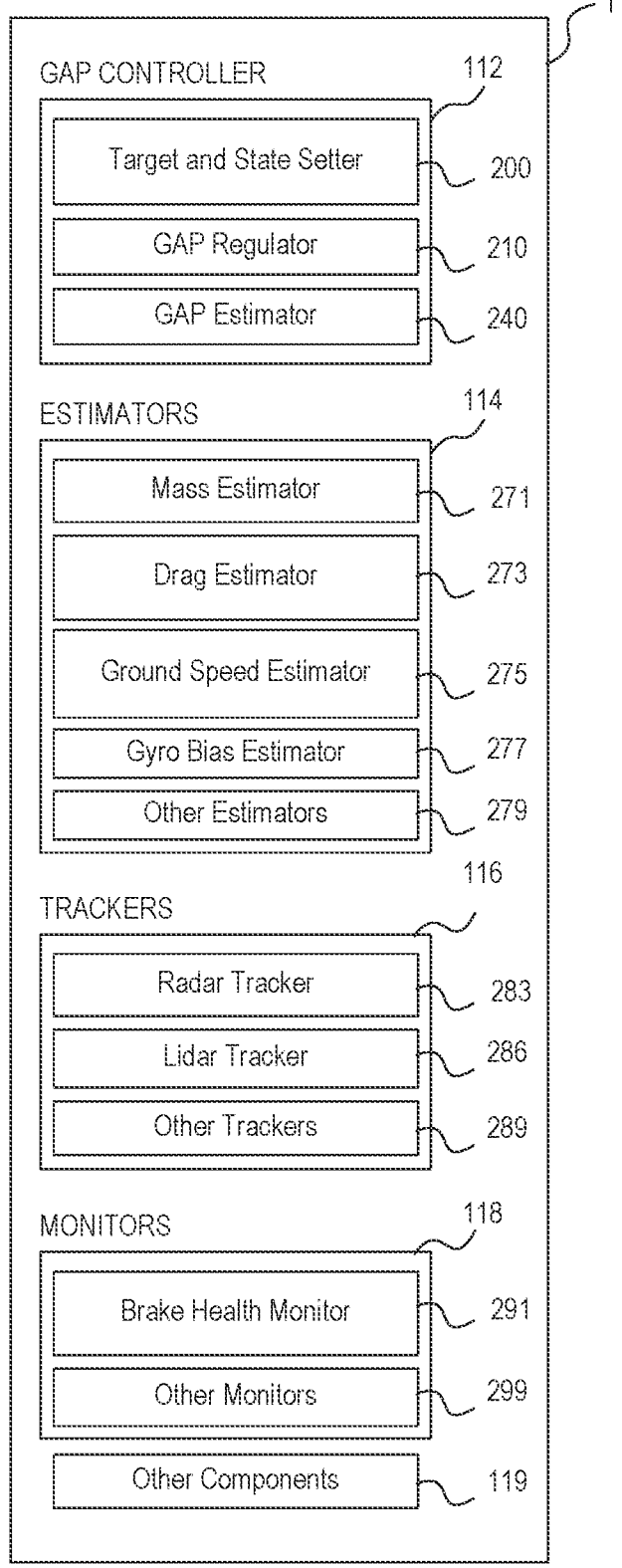
FIG. 2 is a block diagram of a representative platoon controller architecture suitable for use in the automated or partially automated vehicle control system of FIG. 1.

FIG. 2 illustrates a particular embodiment of a platoon controller 110. In the illustrated embodiment, the platoon controller 110 includes a gap controller 112, a plurality of estimators 114, one or more trackers 116, any desired monitors 118 and potentially any of a variety of other components 119.

In the illustrated embodiment, the gap controller 112 includes a target and state setter 200, a gap regulator 210 and a gap estimator 240. In general, the target and state setter 200 is arranged to determine the intended operational mode (state) of the gap regulator 210 and the values of any variable control parameters that are appropriate for use in that operational mode.

The gap regulator 210 is arranged to control the trailing platoon partner in the manner designated by the target and state setter 200. In the gap control operational mode, the gap regulator 210 controls the vehicle in a manner that seeks to attain and maintain the desired gap in accordance with any designated control parameters specified by the state setter 200. In other modes, the gap regulator 210 controls the vehicle in a manner that seeks to attain the appropriate response for the selected operational mode.

The gap estimator 240 is arranged to estimate/determine the current gap based on actual measurements and/or other information that is available to the platoon controller 110. It should be apparent that an accurate understanding of the current gap is important to successful operation of the gap regulator. At the same time, it should be appreciated that any measurement system has inherent tolerances and can be subject to reporting errors and/or may become unavailable in some circumstances. Thus, the gap estimator 240 is configured to receive information from multiple position or relative position related sensors and to fuse such data into a reliable estimate of the current gap.

The torque and braking requests generated by GAP regulator 210 are sent to the appropriate actuator interface (e.g., engine torque interface 161 and brake interface 162 respectively). The engine torque interface 161 then forwards an appropriate torque command to engine torque controller 152 which directs the delivery of the requested torque by directing various engine operating parameters such as fuel charge, valve timing, retarder state, etc. appropriately. The brake interface 162 generates an appropriate brake request that is sent to the brake controller 156.

A particular embodiment of gap controller 112 is described in more detail below with reference to FIG. 3.

Returning to FIG. 2, there are a variety of estimators 114 that are useful for the gap controller 112. In various embodiments these may include one or more of a mass estimator 271, a drag estimator 273, a ground speed estimator 275, a gyro bias estimator 277 and/or other estimators 279.

The mass estimator 271 is arranged to estimate the respective masses of the platoon partners. These mass estimations may be used by the gap controller 112 to help scale its torque and brake requests appropriately based on the respective weights (masses) of the platoon partners.

The drag estimator 273 is arranged to estimate the respective drag resistances of the platoon partners. These drag resistance estimates may also be used by the gap controller to help adjust its torque and brake requests appropriately. In general, the drag resistance of any particular truck or other vehicle can vary based on a variety of factors including: (a) its drag profile (which in the context of a truck may change based on the trailer being pulled—if any, or other characteristics of the load); (b) the vehicle's current speed, (c) wind speed and direction, (d) rolling resistance, (e) platoon state (e.g., whether a platoon is active, the position of the vehicle within the platoon, the gap), (f) bearing wear, etc.

The ground speed estimator 275 is arranged to estimate the actual ground speed of the respective platoon partners. Many trucks and other vehicles have wheel speed sensors that can quite accurately measure the rotational speed of the associated wheels. The actual ground speed at which the vehicles are traveling will vary based on the respective diameters of the wheels and slip conditions of the tires. The precise diameter of the wheels can vary based on the tires used. Furthermore, the diameter of the wheels will vary over time with tire wear, changes in ambient temperature and other factors. The wheel diameter will even change over the course of a particular trip as the tires heat up (or otherwise change in temperature) during use. In practice, all of these variations in wheel diameter are potentially significant enough to impact the gap estimation and gap control. Therefore, the ground speed estimator 275 is arranged to estimate the actual ground speed based on measured wheel speed and other available information such as GNSS information. The ground speed estimates are particularly useful in times when tracker based gap measurements (e.g., radar, cameras, LIDAR, etc.) aren't available—which may occur, for example, when the platoon partners are laterally offset due to a lane change, etc.

Several of the measurements utilized by the gap controller 112 are inertial measurements that are gyro based. These may include yaw measurements which indicate the rate at which the associated vehicle is turning, longitudinal acceleration measurements, etc. Gyros often have an inherent measurement error referred to as a gyro bias that can affect measurements. The gyro bias estimator 277 estimates such biases to allow the gap controller to compensate for such gyro based measurement errors.

The platoon controller 110 can include any other estimators 279 that may be useful to any particular gap controller 112 as well.

The platoon controller 110 may also include one or more trackers 116. Each tracker 116 is arranged to measure or otherwise determine the gap. One type of tracker that is used in many implementations is a radar based radar tracker 283. Newer commercially available trucks often come equipped with a radar unit as standard equipment and radar trackers are particularly well suited for use in such vehicles. Of course, one or more radar units may be installed on any vehicle that does not come pre-equipped with a radar unit to facilitate use of radar tracker 283. By way of example, some specific radar trackers are described in more detail in co-pending U.S. application Ser. Nos. 15/590,715 and 15/590,803, both filed May 9, 2017, both of which are incorporated herein by reference.

LIDAR is another distance measuring technology that is well suited for measuring the gap between vehicles. LIDAR is quickly gaining popularity for use in automated and autonomous driving applications. LIDAR tracker 286 is well suited for use on vehicles that have or are provided with LIDAR units. Cameras and stereo cameras are also becoming more popular distance measuring tools for use in various automated and autonomous driving applications.

Of course, other distance measuring technologies can be used to measure or estimate the gap between vehicles as represented by other trackers 289. By way of example, a GPS tracker could be used that is based primarily on the respective reported GPS positions of the vehicles.

The tracker(s) used in many embodiments are configured to fuse data from multiple sensors to help validate the measurements of the primary sensors used by the respective trackers. The aforementioned radar tracker application describes a variety of methods for fusing data to help validate measurements of a primary sensor in that manner.

In various embodiments, the gap estimator 240 could replace or be replaced by one or more of the trackers, or could be thought of as a tracker itself since it determines/estimates the gap based on inputs from multiple sensors. In the illustrated embodiment, the gap estimator 240 is shown separately as part of gap controller 112 since it fuses distance data from the tracker(s) and any other available sources such as GNSS sensors on each of the vehicles.

The platoon controller 110 may also include one or more monitors 118 that are configured to monitor specific components that are relevant to gap control. By way of example, one specific monitor that is particularly useful to the control of platooning trucks is brake health monitor 291. The brake health monitor 291 is configured to monitor the brake system and to identify circumstances in which the brakes may not be able to deliver the level of braking normally expected for platoon control—as for example could occur if the foundation brakes include drum brakes that have been used while traveling downhill in the mountains to the extent that they are close to overheating. If the brake health monitor 291 identifies such a circumstance, it informs the platoon controller, which can take the appropriate remedial action.

The appropriate remedial action will vary based on the specific circumstances identified by the brake health monitor, but may include, for example, actions such as dissolving the platoon, increasing the target gap to a level more appropriate for the brake conditions, etc. Of course, the brake health monitor can also configured to identify circumstances in which the condition of the brakes has improved (e.g., the brakes have cooled sufficiently) and inform the platoon controller of those circumstances as well so that the platoon controller can act accordingly. For example, improved braking status may allow the target gap to be reduced, a platoon to be reestablished or other appropriate actions.

The platoon controller may include any of a variety of other monitors 299 that are configured to monitor the state or status of other components, systems, environmental conditions, road or traffic conditions, etc. that may be relevant to platoon control. For example, a DSRC link monitor may be provided to monitor the status of a DSRC communication link between the platoon partners.

Figure 3:
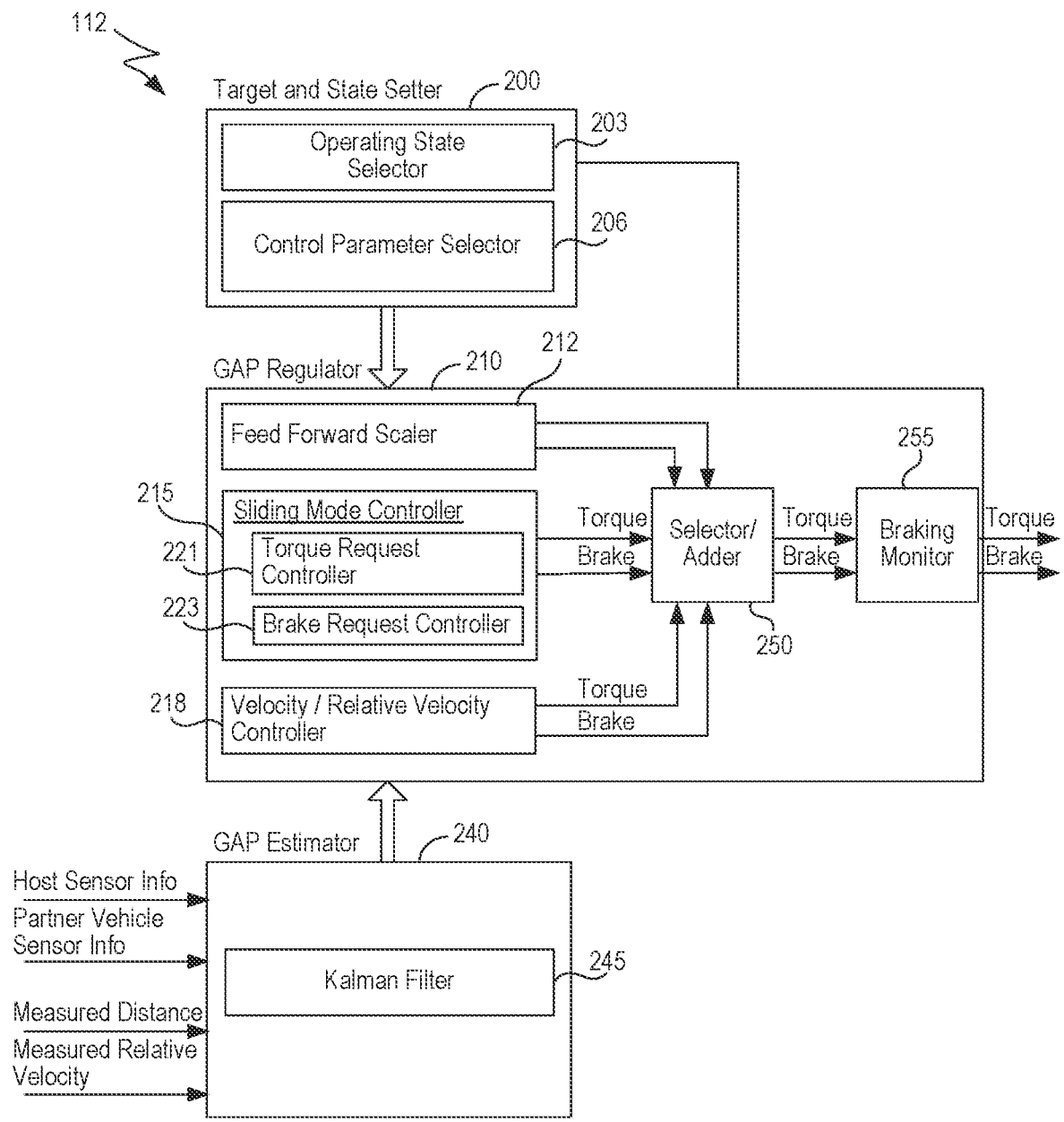
FIG. 3 is a block diagram of a gap controller in accordance with one embodiment.

Referring next to FIG. 3, another embodiment of gap controller 112 will be described in more detail. Similarly to the embodiment illustrated in FIG. 2, the gap controller 112 includes a target and state setter 200, a gap regulator 210 and a gap estimator 240. In the embodiment of FIG. 3, the target and state setter 200 includes an operating state selector 203, and a control parameter selector 206 that determines, selects, sets or otherwise indicates to the gap regulator the values of any variable control parameters that are appropriate for use in the selected operational mode.

The operating state selector 203 is arranged to determine the intended operational mode (state) of the gap regulator 210. In some specific embodiments, the operational modes might include a "normal" or "gap control" operational mode in which the gap regulator is configured to control towards attaining an maintaining a designated gap between the vehicles. In the gap control operational mode control parameter variables dictated by the control parameter selector might include the target gap itself (e.g. 10 m, 12 m, etc.)—which may vary somewhat based on driving conditions (e.g., weather, terrain, road conditions, traffic, etc.). Other control parameters during normal operation may include parameters that impact the draw-in speed, the tightness of the control, tolerances or variations between torque control and braking control, etc. In other embodiments, "initiate platoon" and/or "draw-in" or "pull-in" may be one or more separate states that are used to establish a platoon and/or to bring the platoon partners together in a safe manner under at least partially automated control.

Another potential operational mode is a "dissolve" mode in which the platoon controller transitions the trailing vehicle toward/to a position at which the driver of the trailing vehicle (or an automatic cruise control system) can safely take over control of the vehicle. Generally, dissolving a platoon includes increasing the gap between the vehicles in a controlled manner to/towards a point at which the platoon can be dissolved and vehicle control can be safely transferred to manual control by the driver or to control through the use of a different system such as adaptive cruise control. The dissolve mode may optionally be triggered by a wide variety of different circumstances, as for example, in response to one of the platoon partners or the NOC deciding to terminate the platoon; the detection of a car cutting-in between the platooning vehicles; the loss of communications between the vehicles for an extended period; the detection of an object in front of the lead vehicle that is too slow or too close to the platoon; etc.

Another potential operational mode may be a velocity control or relative velocity control mode. Velocity control, or relative velocity control may be preferable to trying to control to maintain a particular gap in a variety of specific circumstances—as for example when the trailing vehicle's radar (or other) tracking unit loses sight of the partner vehicle, as can occur when there is a lateral offset between the vehicles due to a lane change or other conditions.

Of course, there can be a variety of other operational modes as well.

The gap regulator 210 is arranged to control the trailing platoon partner in the manner designated by the target and state setter 200. In the embodiment illustrated in FIG. 3, the gap regulator 210 includes a scaler 212 and two separate controllers which are used in different combinations in different operating modes. In the illustrated embodiment, the controllers include a sliding mode controller 215 (which performs gap control) and a velocity/relative velocity controller 218. It should be appreciated that in other embodiments, a single controller, additional and/or different may be provided as appropriate for any particular implementation.

In the illustrated embodiment, the feed forward scaler 212 is configured to scale the torque and brake signals from the front vehicle before adding them to the outputs from the sliding mode and relative velocity controllers 215, 218 to create the torque and brake request to the engine and brake controllers. Such scaling may be based on factors such as the respective weights (masses) of the platoon partners, the respective drags of the vehicles, the severity of a braking event (e.g., in high braking scenarios, the braking command may be increased a bit to provide a margin of safety to account for uncertainties in braking performance and reactions times), etc. In other embodiments, such scaling functions can be integrated into the respective controllers themselves if desired.

The sliding mode controller 215 is configured to control the trailing vehicle in a manner that seeks to attain and maintain the desired gap in accordance with the target gap and any other control parameters specified by the control parameter selector 206. Thus, its primary function is gap control. The velocity controller 218 is configured to control the trailing vehicles in a manner that maintains a designated velocity relative to the lead vehicle, or in some circumstances, simply a designated velocity. In the illustrated embodiment, these two separate controllers are provided so that the gap regulator 210 can provide different types of control, as may be appropriate in different operational circumstances. A few specific examples are described with reference to FIGS. 4A-4C. In the described embodiments, both the controllers 215 and 218 are operated continuously during platooning and the selector/adder 250 is used to select the appropriate signals to output based on the current operating mode. An optional braking monitor 255 is a safety feature that may be utilized to help ensure that the brake commands outputted by selector/adder 250 don't overly aggressively brake the trailing vehicle except in where necessary from a safety/crash prevention standpoint. This is to reduce the risk of traffic behind the trailing platoon partner from being impacted by unexpected aggressive braking of the trailing platoon partner.

Figure 5:
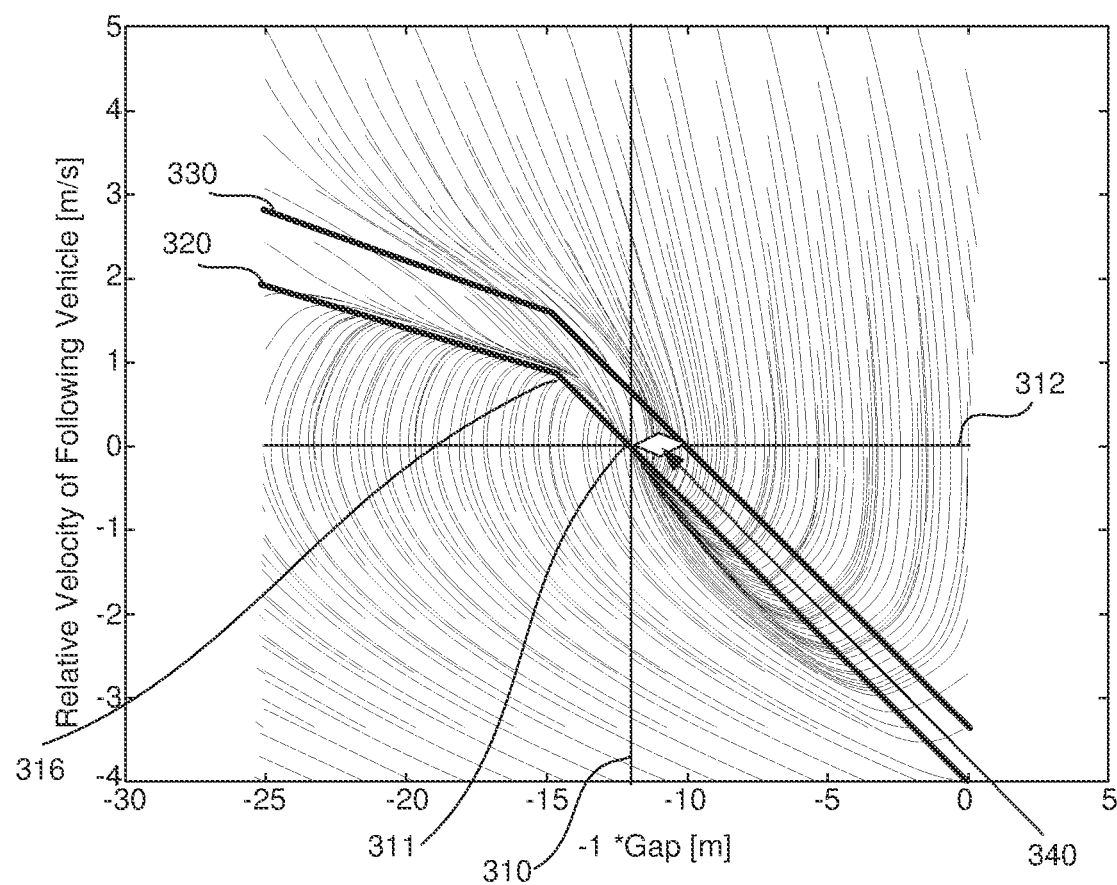
FIG. 5 is a state space diagram illustrating a sliding mode control scheme.

The sliding mode controller 215 is arranged to control the trailing vehicle in a manner such that its relative velocity relative to the front vehicle varies as a function of the gap between the vehicles. This characteristic is illustrated in the state space diagrams of FIG. 5 which show a control scheme in accordance with one specific implementation. More specifically, FIG. 5 plots relative velocity between the vehicles (the Y-axis) vs. gap between the vehicles (the X-axis). FIG. 5 also show a torque request controller target control line 320. In the illustrated embodiment, the nominal desired gap is 12 meters—which is represented by line 310. Thus, the target control point 311 is 12 meters with zero relative velocity, which is the point represented by the intersection of line 310 (12 meters gap) and line 312 (zero relative velocity).

The torque request controller component 221 of gap regulator 210 is configured to generate a torque request that is appropriate to control the gap in accordance with target control line 320. The torque request is then implemented by engine torque controller 152. As can be seen in FIG. 5, when the gap is larger than the desired gap, the rear truck is controlled to travel slightly faster than the front truck is traveling such that the relative velocity of the rear truck has a small positive value. As the rear truck draws closer to the lead truck, its relative velocity is reduced in a smooth manner until the gap is reduced to the target control point 311, at which point the relative velocity would be zero if perfect control were attained. If the rear truck gets closer than the desired gap, it is slowed so that it has a negative relative velocity relative to the lead truck to reestablish the desired gap.

The sliding mode controller 215 utilizes a unified sliding mode control scheme during both the "pull-in" and gap maintenance stages of platooning. Configuring the sliding mode controller to control towards target control line 320 helps ensure that the relative speed vs. gap relationship stays within a region safe for platooning.

In the embodiment illustrated in FIG. 3, the sliding mode controller 215 includes separate controllers (e.g. torque request controller 221 and brake request generator components 223) which are configured to control towards different gap control targets. The different control targets are illustrated in the state space diagrams of FIG. 5 which show a control scheme in accordance with one specific implementation. More specifically, FIG. 5 shows a brake request controller target control line 330 in addition to torque request controller target control line 320. FIG. 5 additionally shows representative transition paths from various points in the state space to the torque request target control line 320.

For most open highway driving conditions, modulating the torque request alone is sufficient to control the gap appropriately without requiring the use of the foundation brakes. This is in part because the torque request can be negative to a certain degree without needing to actuate the foundation brakes through the use of engine braking and/or the retarder (if available). As mentioned above, when fuel is cut-off there will be some pumping losses and some frictional losses in the powertrain, so some level of negative torque can be provided while using normal valve timing by simply reducing the fuel charge appropriately. When larger negative torque is needed, the engine torque controller 152 can create larger negative torques by actuating the retarder and/or by taking other appropriate measures.

Separately, the brake request controller component 223 of gap regulator 210 is arranged to generate brake requests during normal operation that are generally arranged to maintain a different gap—specifically a smaller gap—than the torque request controller 221 targets. This difference in the gaps that the torque and brake request controllers control to is sometimes referred to herein as the gap tolerance 340. In general, brake requests 213 are not generated unless or until the gap is reduced at least the gap tolerance below the torque request target control line 320. Since the brakes can only be used to slow the vehicle, the effect of this difference is that the trailing truck will be allowed to creep in a relatively small amount (2 meters in the example) before the foundation brakes are actuated when the gap regulator 210 cannot maintain the desired gap through control of the torque request alone. When the desired gap can be restored by modulating the torque requests alone without crossing target brake control line 330, then the foundation brakes do not need to be used at all. This has the effect of safely maintaining a gap while reducing the probability that the foundation brakes will be deployed unnecessarily.

Figure 4A:
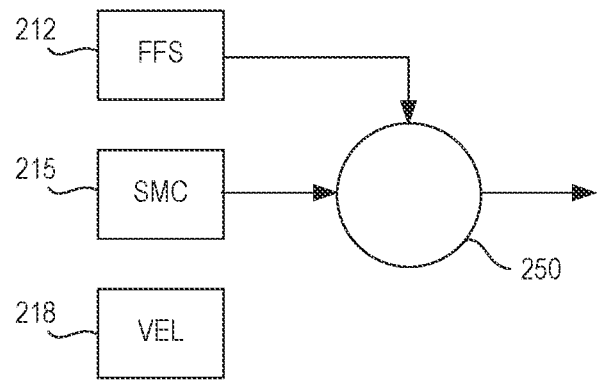
FIGS. 4A-4C are a series of diagrams illustrating different control states used by a gap regulator in accordance with one embodiment during different operational states.

Normal gap control is illustrated in FIG. 4A. During normal gap control, the sliding mode controller 215 is use to determine torque and brake requests that are appropriate to attain and maintain the target gap set by control parameter selector 206. When appropriate, the torque and brake requests generated by the sliding mode controller 215 may be scaled appropriately by selector/adder 250 based on inputs from feed forward scaler 212. In this normal gap control mode, the outputs of the relative velocity controller 218 are not used in the control of the trailing vehicle.

In some embodiments, the sliding mode controller 215 includes separate torque request and brake request controllers 221, 223 as illustrated in FIG. 3. The torque request and brake request controllers 221, 223 are configured to control the engine and brakes respectively towards different gap targets which tends to provide a smoother, more comfortable ride and reduce the use of wheel brakes (e.g., the foundation brakes in tractor-trailer rigs) compared to control in which the engine and brakes are controlled to the same target gap. Such a gap control architecture is described in more detail in U.S. Provisional application No. 62/489,662, which is incorporated herein by reference.

Although the sliding mode controller 215 works very well to control the gap, there will be operational circumstances in which different types of control may be appropriate. For example, a different type of control may be desirable when it is necessary to dissolve a platoon and return the trailing vehicle to manual or other automated control. Typically, the gap between vehicles during platooning will be smaller, often much smaller, than can safely be maintained by a driver under manual control. Therefore, in general, when a platoon is dissolved with the intent to restoring manual control of the trailing vehicle, it will be desirable to grow the gap to a distance that is appropriate for manual control before relinquishing control to the driver. This can be accomplished in a smooth manner by relative velocity controller 218.

Figure 4B:
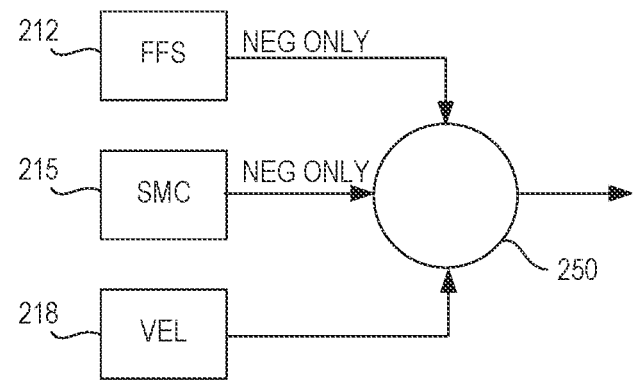

When operating state selector 203 determines that the platoon should be dissolved, it directs the GAP regulator 210 to transition to a dissolve mode as represented by FIG. 4B. In the dissolve mode, primary control is provided by relative velocity controller 218. The control parameter selector 206 may designate a desired (target) relative velocity for the trailing truck during the dissolve. The specific target relative velocity may vary based on the nature of the circumstances and/or the vehicles involved in the platoon. In general, it is desirable to select a relative velocity that will cause the vehicles to gradually, but expeditiously separate, without requiring the trailing vehicle to slow excessively (which could unduly hinder following traffic) and preferably without requiring the lead vehicle to alter its drive plan. By way of example, relative velocities during dissolves on the order of 0.5 to 4 meters per second, as for example, 1-2 m/s, have been found to work well in the context of platooning trucks.

During a dissolve, the lead vehicle may take a variety of actions. For example, the lead truck may accelerate or increase its torque command aggressively. In such cases, it may not be desirable to try to accelerate the trailing truck in a similar manner thereby allowing the lead vehicle to pull away more than would otherwise occur under relative velocity control. One way to accomplish this in the context of platooning trucks is to ignore or otherwise disable positive torque commands from feed forward scaler 212.

Another potential scenario is that the lead truck brakes or slows significantly while under velocity control. In some circumstances, the velocity controller 218 may be configured to permit a certain amount of gap shrinkage when the gap is relatively larger to thereby reduce the overall amount of braking required. In the illustrated embodiment, the sliding mode controller is configured to ensure that the gap between the vehicles is always sufficient to give the trailing vehicle sufficient time to respond in a manner that prevents the trailing vehicle from running into the back of the lead vehicle regardless of the occurrence of (reasonable) unexpected events. Therefore, if the sliding mode controller is outputting a braking or negative torque signal that has a greater magnitude than the relative velocity controller, then that larger braking/negative torque command should be passed to the vehicle's engine and braking controllers. Therefore, during a dissolve, the selector/adder 250 is configured to only utilize negative commands (i.e., braking commands and negative torque commands) from the sliding mode controller 215 and to only use such commands when they are greater in magnitude than the commands from the relative velocity controller 218.

There may also be operational circumstances outside of dissolves in which relative velocity control or simply velocity control is desired. For example, there may be circumstances in which the back of the lead vehicle moves out of view of the trailing vehicle's tracker(s) 116 or the tracker(s) 116 otherwise loses sight of the back of the platoon partner. This can occur, for example, as a result of a lane change by one of the platoon partners. In such a circumstance the gap regulator may not have an accurate measure of the longitudinal gap between the vehicles—and may have to rely on less accurate approaches for determining the gap such as the vehicle's respective GNSS positions. In such circumstances, it may be desirable to control the trailing vehicle to slowly drop back until the back of the lead vehicle comes within the tracker's view. Again, the relative velocity controller 218 is well suited for use in this circumstance—although the preferred relative velocity control may be a bit different than occurs during a dissolve. Specifically, the goal is typically not to drop back as quickly or as far as would occur during a dissolve—thus a smaller relative velocity (e.g. 0.5 m/s vs. 2 m/s), may be appropriate.

Figure 4C:
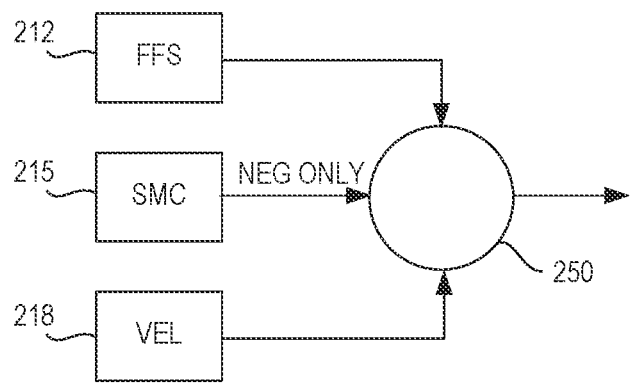

One approach to such relative velocity control is illustrated in FIG. 4C. In the velocity control scheme of FIG. 4C velocity controller 218 is used in conjunction with normal scaling from feed forward scaler 212. This causes the trailing platoon partner to better follow lead vehicle accelerations and/or torque increases than occurs during the dissolve state illustrated in FIG. 4B. At the same time, for safety purposes, braking requests and negative torque request from the sliding mode controller 215 may be utilized as appropriate by selector/adder 250 in a manner similar to the approach described above with respect to FIG. 4B.

Although particular platoon and gap controller architectures are illustrated in FIGS. 2 and 3, it should be appreciated that the specific architectures utilized may vary widely to meet the needs of any particular platooning or other automated vehicle control scheme.

As will be apparent to those familiar with the art, the described controllers can be implemented algorithmically using software or firmware algorithms executing on one or more processors, using programmable logic, using digital or analog components or using any combination of the preceding.

In the detailed description above, it is assumed that the controlled power plant is an internal combustion engine, as for example a diesel engine. However, it should be appreciated that the described control approach can be utilized regardless of the nature of the power plant used to provide torque to drive the host vehicle. Thus, the described controller design, functionalities and architectures may generally be applied to the control of vehicles that utilize electric motors, turbines, fuel cells, or other types of powerplants to provide power to a drivetrain or directly to one or more wheels, including hybrids which combine more than one type of powerplant (e.g., hybrids that incorporate both an electric motor and an internal combustion engine). When the power plant is or includes an internal combustion engine, any type of internal combustion engine may be used including gas powered engines, diesel powered engines, two-stroke engines, 4-stroke engines, variable stroke engines, engines utilizing more than four-strokes, rotary engines, turbine engines, etc.

The description above has focused primarily on tractor-trailer truck platooning applications, however, it should be appreciated that the described control approach are well suited for use in a wide variety of connected vehicle applications, regardless of whether one or more of the vehicles involved have 2, 3, 4, 18 or any other number of wheels, and regardless of nature of the powerplants used in such vehicle.

Figure 6:
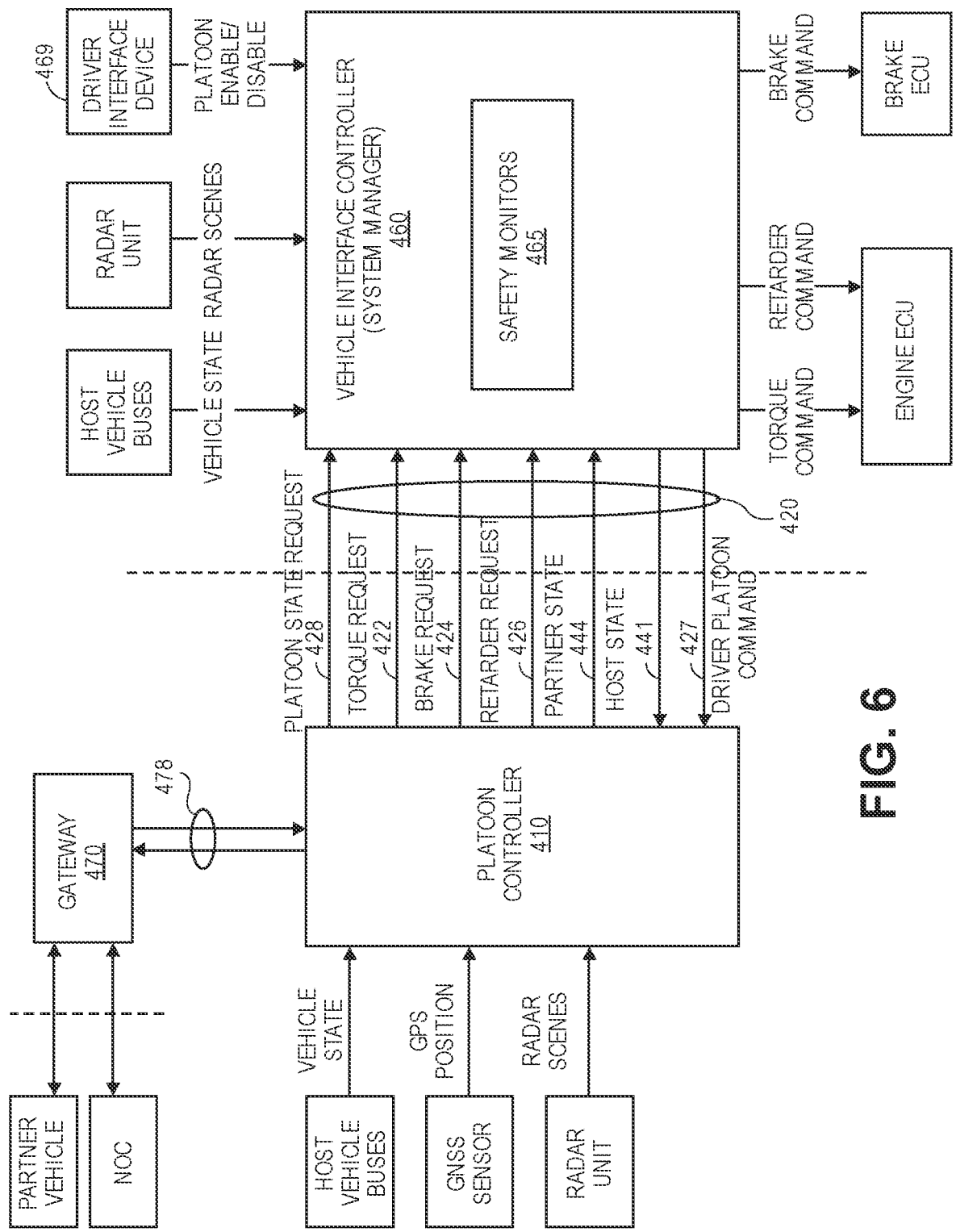
FIG. 6 is a specific ASIL compliant controller hardware architecture suitable for use in an automated or partially automated vehicle control system that supports platooning.
Figure 7:
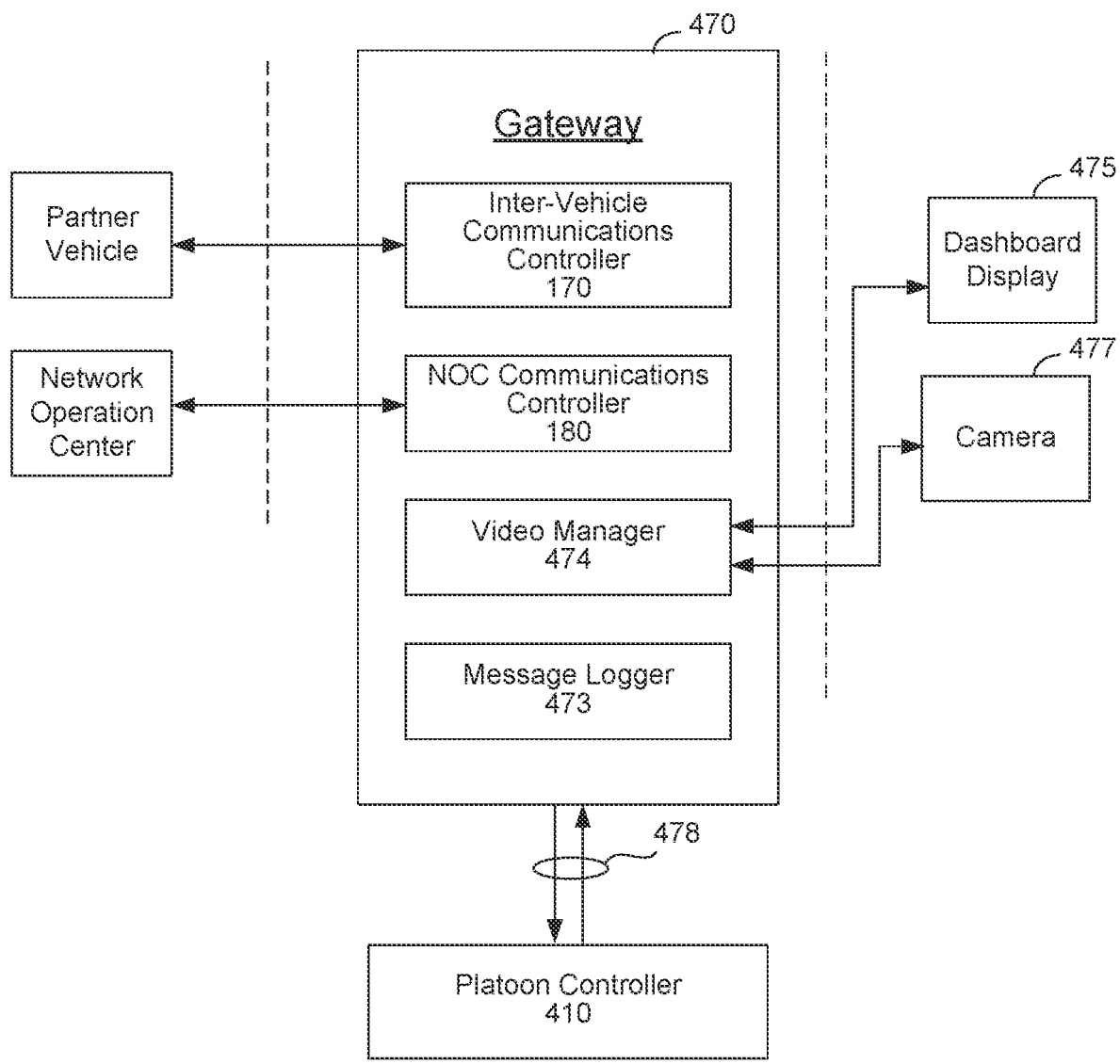
FIG. 7 illustrates components of a gateway in accordance with one embodiment.

FIG. 6 illustrates a platoon control system hardware architecture that is particularly well suited suitable for ASIL compliant platoon control. The illustrated embodiment includes three separate controller hardware units. These include platoon controller 410, vehicle interface controller 460 and gateway processor 470. Selected components of a representative gateway processor 470 are illustrated in FIG. 7. As best seen in FIG. 6, the platoon controller 410 communicates with the vehicle interface controller 460 through an interface 420 and with gateway 470 through a direct link 478. In some embodiments, the link 478 is a dedicated direct wired connection and no other devices are coupled to that link. The wired connection may be provided by any suitable form of cabling or traces, as for example co-ax cable, twisted pair wirings, fiber optics or any other suitable physical connection medium.

In the illustrated embodiment, the platoon controller 410 incorporates all of the functionality of platoon controller 110 described above. The vehicle interface controller 460 (also sometimes referred to as a system manager) performs the functionality of actuator interface 160 and further includes a number of safety monitors. In some embodiments, the safety monitors are arranged to execute ASIL compliant safety monitoring algorithms and the vehicle interface controller 460 is designed as an ASIL compliant device.

In general, the vehicle interface controller 460 includes a higher safety level processor and software (including the safety monitors) that independently verifies the commands transmitted by the platoon controller 110 before they are passed on to the vehicle actuators. These verifications use a subset of the available sensor inputs, together with verification algorithms that are independent and distinct from those used by the platoon controller.

The gateway processor 470 is arranged to coordinate communications between a host vehicle and the platoon partner(s) and to coordinate communication between the host and the network operation center and/or any other entities that are external to the vehicle. As such, in a specific implementation of the system illustrated in FIG. 1 the gateway processor 470 includes the inter-vehicle communications controller 170 and NOC communication controller 180 as best illustrated in FIG. 7. Typically the inter-vehicle communications controller utilizes a short-range, vehicle-to-vehicle wireless communications protocol, as for example the DSRC protocol. The NOC communication controller typically communicates with a networks operations center using cellular or satellite communications.

In some embodiments, the connection (link 478) between the gateway processor 470 and the platoon controller 410 is a dedicated direct wired connection and no other devices are coupled to the link. In some implementations an Ethernet or similar standardized wired communications protocol is used to pass information between the gateway processor and the platoon controller. This facilitates high speed, high reliability communications between the gateway processor and the platoon controller. In a specific example, a 100BASE or higher (e.g. 1000BASE, 10GBASE, etc.) Ethernet physical layer may be used, although it should be appreciated that a variety of other physical layers may be used in other embodiments.

In some embodiments, the gateway processor 470 is also arranged to communicate with a forward facing camera 477 mounted on the vehicle and a dashboard display 475. When the host vehicle is the lead vehicle in a platoon, the gateway processor transmits a video feed received from the forward facing camera 477 to the trailing vehicle(s) so that the driver of the trailing vehicle has a view of what is in front of the lead vehicle. When the host vehicle is a trailing vehicle in the platoon, the gateway processor 470 receives such a video feed from the gateway processor on the lead vehicle and transmits the feed to the dashboard display 475 where it is displayed to give the driver of the host vehicle a view of what is in front of the lead vehicle. Displaying a view of what is in front of the lead vehicle to drivers of a trailing vehicle is desirable to provide the driver of the trailing vehicle with improved situational awareness and the ability to independently react to situations that occur in front of the platoon. This can be particularly important because in many platoons (e.g. platoons that involve tractor trailer trucks) the trailing vehicle will be very close to the lead vehicle (much closer than normal manual driving) and the lead vehicle will effectively block the view of the trailing vehicle which can be an uncomfortable experience for drivers and/or passengers in a trailing platoon partner—especially when they do not have access to a view of what is going on in front of the platoon.

The video streams passed through the gateway may be managed by a video manager 474. Since the gateway 470 communicates directly with the camera 477 and/or dashboard display 475, the platoon controller 410 is not in any way burdened by the need to manage that data flow.

In some embodiments the gateway 470 also includes a message logger 473 that logs various messages and other information passed there through in order to provide a record for diagnostic purposes and the like. The functionality of the message logger 473 will be described in more detail below.

The platoon controller 410 is configured as a listener on any appropriate vehicle communications buses where it can directly obtain information about the vehicle's operational state—such as the vehicle's current wheel speed, any brake or accelerator pedal inputs, steering wheel position (as appropriate), transmission gear, etc. It is also coupled to sensor units such as GPS unit 131 to receive positional information about the location of the vehicle, and to forward looking radar unit 137 to receive information about the position of objects outside the vehicle (e.g., radar scenes). Similar information may be obtained from other sensors as well, such as LIDAR 138, camera(s) 139 etc. Since the platoon controller 410 is configured strictly as a listener on the vehicle's communication bus(es) and does not itself transmit information over such bus(es), it does not need to be ASIL compliant, as long as the control commands it outputs to the vehicle interface controller are verified to ASIL standards by the vehicle interface controller 460.

The vehicle interface controller 460 (also sometimes referred to as the system manager 460), which is ASIL compliant, is arranged to send commands to, and otherwise communicate with, the vehicle's engine controller (EECU), the brake controller (BECU), and/or any other appropriate controllers either directly or via one or more communications buses, such as the vehicle's CAN bus(es).

In the illustrated embodiment, the interface 420 between platoon controller 410 and vehicle interface controller 460 (also sometimes referred to as the system manager 460) is fairly narrowly defined. It includes the substantive commands generated by the platoon controller—which in the illustrated embodiment include torque request 422, brake request 424, and optionally a retarder request 426. When the platoon controller also controls the steering or other aspects of the host vehicle steering and/or other appropriate control commands (not shown) may be included as well.

The interface 420 also includes a platooning state indicator 428 that is a signal from the platoon controller indicating whether or not it believes that its output should be directing operation of the vehicle. The platooning state indicator 428 may take many forms, as for example a simple flag that when high indicates that the platoon controller 410 believes that platooning is/should be active and that its torque, braking and retard commands 422, 424, 426 should be followed. In such an arrangement, a low flag state indicates that the platoon controller believes that it is not controlling the vehicle. The vehicle interface controller 460 does not forward any torque, braking, retard or other control commands at any time that the platooning state indicator 428 indicates that platoon control is not active. In the event (generally unlikely) that one of the safety monitors 465 indicates that platooning is not appropriate when the platoon controller 410 believes that platooning is valid (as indicated by platooning state indicator 428), the vehicle interface controller/system manager 460 initiates a termination of the platoon.

The interface 420 also facilitates the transmission of certain state information—which is preferably ASIL validated state information—about both the host vehicle and the partner truck that is useful to the safety monitors. Specifically, the host vehicle state information 441 includes state information about the host vehicle that has been validated (e.g., ASIL-C validated) by the system manager 460 and is useful to one or more safety monitors on the partner vehicle. The partner vehicle state information 444 includes state information about the partner vehicle that has been validated by the partner vehicle's system manager and is useful for one or more safety monitors 465 on the host vehicle. Host vehicle state information 441 is transmitted to the platoon controller 410, which forwards such information without modification to the gateway 470, which in turn forwards the host vehicle state information to the gateway on the partner vehicle. Partner vehicle state information 444 received by gateway 470 from the partner vehicle's gateway is forwarded without modification to the platoon controller 410 and from there to system manager 460 (again without modification). Preferably the host state information 441 is transmitted with a checksum or other suitable data integrity verification mechanism that allows the receiving system manager to verify that the data it receives is uncorrupted. Any corrupted information can then be ignored. With this approach the ASIL validated state information is passed without modification from one ASIL compliant device (system manager 460 on a first platoon partner) to another (system manager 460 on a second platoon partner) and therefore is suitable for use in ASIL compliant safety checking algorithms—even when intermediate transmitting devices (e.g., platoon controller 410, gateway 470) are not themselves ASIL compliant.

The host and partner vehicle state information may include any ASIL validated state information that is used by any of the safety monitors. This may include, for example, vehicle wheel speeds, brake requests, torque requests and/or delivered torque, brake air supply pressure, steering position, accelerometer readings and/or any other information about the partner vehicle used by the system manager 460 as part of a safety monitor. To the extent that the platoon controller 410 utilizes partner state information originated by an ASIL validated device beyond the state information used by the system manager 460, that information can optionally be included in the vehicle state information 441, 444 as well—although such inclusion is not necessary and usually not desirable since such information can typically be obtained and sent by the partner vehicle's platoon controller, which reduces the bandwidth that needs to be allocated to the interface 420.

It is noted that some of the host vehicle's sensor information (e.g., wheel speed, brake pedal position, radar scenes, etc) is used by both the platoon controller 410 and the system manager 460. Since the platoon controller 410 is preferably an authorized listener on any appropriate vehicle control bus(es), the platoon controller does not need to wait to receive such information from the system manager. Rather, it obtains any relevant host vehicle sensor information directly from the appropriate sensor over any suitable connection such as an appropriate CAN bus. However any sensor information relevant to the system manager on the partner vehicle is read by the system manager (regardless of whether it is also read by the platoon controller) and included in host vehicle state information 441 so that the partner vehicle's system manager is ensured that such information is ASIL verified. In other embodiments any host vehicle sensor information that is not directly accessible by the platoon controller can be received via the system manager 460 acting as an intermediary.

Although there will be some overlap in the sensor information used, it should be appreciated that the host vehicle sensor information used by the host vehicle platoon controller 410 and the host vehicle system manager 460 will often vary and may further vary from the partner vehicle sensor information of interest. For example, the host platoon controller utilizes GNSS position data in the determination of the torque and braking requests, however the GNSS position information may not be utilized by the System Manager since it is not ASIL compliant.

Some of the sensor information that is used by the safety monitor on the host vehicle may not be needed by the safety monitor on the partner vehicle. This may include information such as the radar scenes, the accelerator pedal position, inputs from a host vehicle driver interface device 469, etc. To the extent that such sensor information is not used by the partner vehicle, there is no need for such information to be included in the vehicle state information 441, 444.

Some of a host vehicle's sensor information that is used by the platoon controller on the partner vehicle may not be ASIL compliant and therefore may not be used in the safety monitors on the partner vehicle. Such, sensor information that is not relevant to the safety monitors on the partner vehicle does not need to be included as part of vehicle state information 441, 444. Rather, such data may be obtained by the platoon controller 410 and sent to the corresponding platoon controller on the partner vehicle (by way of communication controllers 470). For example, it is extremely difficult to ASIL validate GPS or other GNSS position data. Therefore, GNSS position data is preferably not included in the vehicle state information 441, 444. Rather, such information is passed from the host vehicle's platoon controller to the partner vehicle's platoon controller via the gateways 470.

The driver interface device 469 may be a button or other suitable mechanism positioned at a convenient location on the host vehicle dashboard or elsewhere in the host vehicle cabin. The driver interface device 469 is a mechanism that the driver may press as appropriate to indicate that the driver is ready to platoon during initiation of a platoon, or to initiate the dissolution of a platoon when platooning is no longer desired. The use of the driver interface device 469 is described in more detail in U.S. patent application Ser. No. 15/607,902 which is incorporated herein by reference. In the illustrated embodiment, commands from the driver interface device 469 (which are preferably ASIL compliant) are sent to the vehicle interface controller 460 and passed from there to the platoon controller 410. Similarly, requests to the driver interface device pass from the platoon controller to the vehicle interface controller 460 and from the vehicle interface controller 460 to the driver interface device 469. This architecture simplifies the work that must be done to make the driver interface device 469 ASIL compliant. It should be appreciated, however, that in other embodiments, the platoon controller 410 may also be a direct listener to commands from the driver interface device. In the embodiment illustrated in FIG. 6, interface 420 includes driver platoon related requests and commands 427 which represent the request sent to and commands received from the driver interface device 469.

In some specific embodiments, the vehicle interface controller 460 is implemented as a single dedicated integrated circuit chip and the platoon controller 410 and gateway processor 470 are each implemented as separate system on modules (SOMs).

The platoon control system hardware architecture illustrated in FIG. 6 is particularly well suited for efficiently handling platooning control related tasks in an ASIL compliant manner using information available from a variety of sources including sources that are not themselves ASIL. With the described arrangement, the powertrain control commands ultimately issued by the control system may be ASIL rated.

The hardware architecture of FIG. 6 also has several advantages from a security standpoint. In the illustrated embodiment, the gateway processor 470 is not connected to any of the vehicle's control related communications buses (e.g., the CAN bus(es)). Therefore, the gateway processor 470, which is potentially the least secure of the three hardware components, is not able to transmit any information directly onto any of the more secure vehicle communications buses or receive any information directly from such buses—which is advantageous from a security standpoint since a nefarious entity cannot gain control the vehicle in any way by somehow hacking into the gateway processor 470. Furthermore, with this arrangement, the gateway processor 470 does not need to be ASIL compliant which greatly simplifies its certification.

System and Method for Mitigating or Avoiding Risks Due to Hazards Encountered by Platooning Vehicles During the course of driving, a road obstacle or other hazard may cause a lead vehicle in a platoon to react and take action to avoid risks associated with the hazard. Under such circumstances, the lead vehicle reacting before the following vehicle often increases risks. For example, if the lead vehicle brakes before the following vehicle, in a worst case scenario, it is conceivable that the following vehicle may collide with the leading vehicle.

Such problems caused by road obstacles or hazards are avoided or mitigated by (1) receiving data generated by one or more sensors arranged to interrogate a space radially extending from the lead vehicle as the lead vehicle travels over the road surface, (2) ascertaining a hazard caused by an object in the space from the data indicative of the perceived environment and (3) causing the following vehicle, while operating in the platoon, to take a preemptive action to avoid or mitigate risks resulting from the hazard caused by the object in the space, the preemptive action taken by the following vehicle prior to and/or without waiting for the lead vehicle taking any action in response to the object in the space. For example, by slowing the following vehicle before the lead vehicle, it has been the incidence of collision between the platooning vehicles is significantly reduced.

While scenario above describes a situation of hazard avoidance, it should be understood that present invention is directed to a boarder concept. For instance, the present application is should be construed as addressing the general concept of using sensor data collected or generated by one vehicle in a platoon to control the operation of another vehicle in the platoon. Typically, the data is used by the receiving vehicle to avoid hazardous conditions or other risks. However, this is by no means a requirement. On the contrary, the data can be used by the receiving vehicle for just about any purpose.

Figure 8:
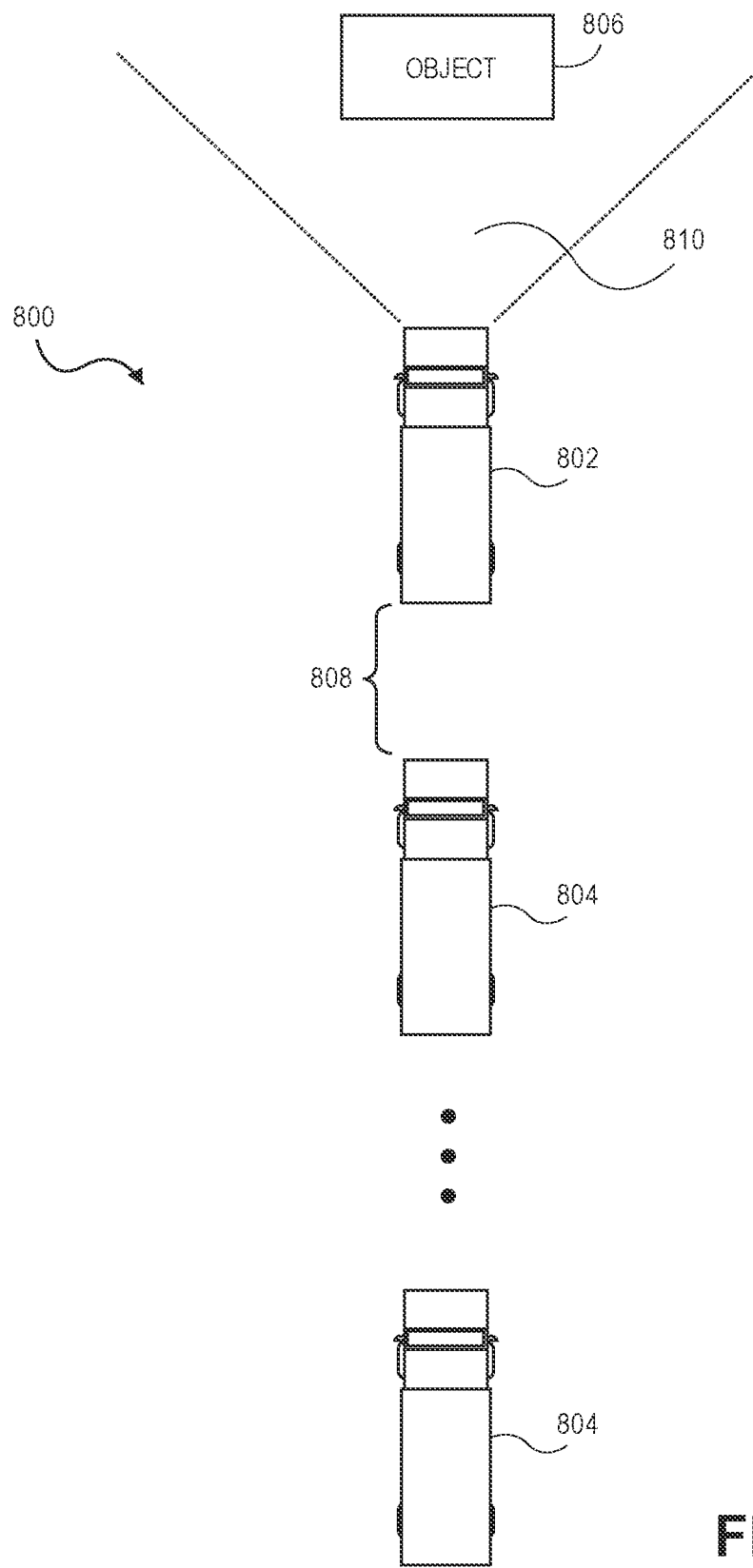
FIG. 8 is a diagram showing a lead vehicle and several following vehicle(s) encountering a hazard represented by an object while traveling across a road surface.

Referring to FIG. 8, a diagram 800 showing a platoon including a lead vehicle 802 and several following vehicle(s) 804 encountering a hazard, represented by an object 806, while traveling across a road surface is illustrated. As the vehicles are operating in a platoon, a gap 808 is provided and controlled between any pair of leading and following trucks as described in detail above.

The lead vehicle 802 includes one or more sensors (not illustrated in FIG. 8) that are used to interrogate a space, designated by reference numeral 810. In this particular embodiment shown, the space 810 extends radially outward from the front of the vehicle 802, encompassing the road ahead. It should be understood, however, that the particular direction and shape of the space 810 as depicted is by no means limiting. On the contrary, the space 810 in various embodiments can radiate outward from the front, side(s) rear, 360 degrees or any fraction thereof, around the lead vehicle 802. Thus, the space 810, which is interrogated by the aforementioned sensor(s), should be widely construed to cover any applicable shape or direction.

As the platoon travels down the road surface, the sensor(s) on the lead vehicle 802 generate data indicative of the perceived environment within the space 810. As a result, a hazard caused by the presence of an obstacle, such as object 806, may be ascertained. In various embodiments, the object 806 represents a wide variety of potential obstacles, such as other vehicles (e.g., cars, trucks, motorcycles), pedestrians, a cyclist, road debris, traffic signs or posts along the side of the road, or just about any other possible obstruction that may be encountered while driving.

The Applicant has found that with platooning vehicles in non-emergency situations, risks associated with hazards, such as created by an obstacle 806, are often mitigated or altogether avoided by directing the following vehicle 804 to take a preemptive action prior and/or without waiting for the lead vehicle 802 to react to the obstacle. For example, if the platoon crests a hill on a highway and suddenly encounters stopped cars (e.g., objects 806 that represents a hazard) ahead on the highway, then the following vehicle 804 preferably brakes or takes some other preemptive action to slow down before the lead vehicle 802 slows down. By braking earlier, the rate at which following vehicle loses velocity is greater than the lead vehicle. As a result, the gap 808 between the two vehicles increases, potentially dissolving the platoon. The likelihood that the following vehicle 804 colliding with the leading vehicle 802 is therefore significantly reduced.

In various implementations, the processing of the data generated by the sensor(s) on the lead vehicle, indicative of the perceived environment within the space 810, may be performed either on the following vehicle 804 or the lead vehicle 802. Two such embodiments are described below.

Figure 9A:
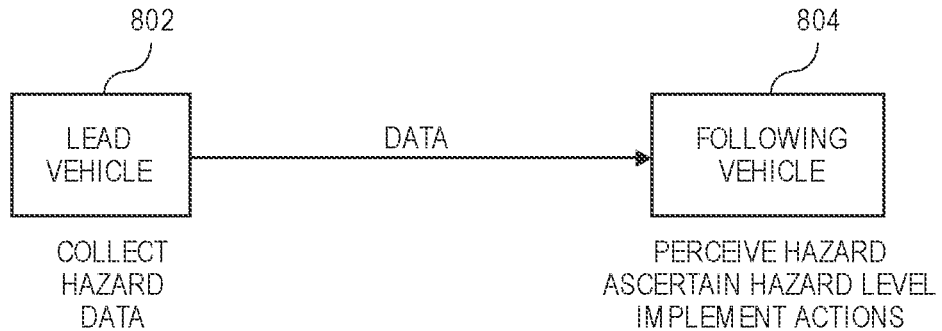
FIGS. 9A-9C are a set of block diagrams illustrating a non-exclusive embodiment of a system for mitigating or avoiding risks due to hazards encountered by connected vehicles in accordance with the present invention.
Figure 9B:
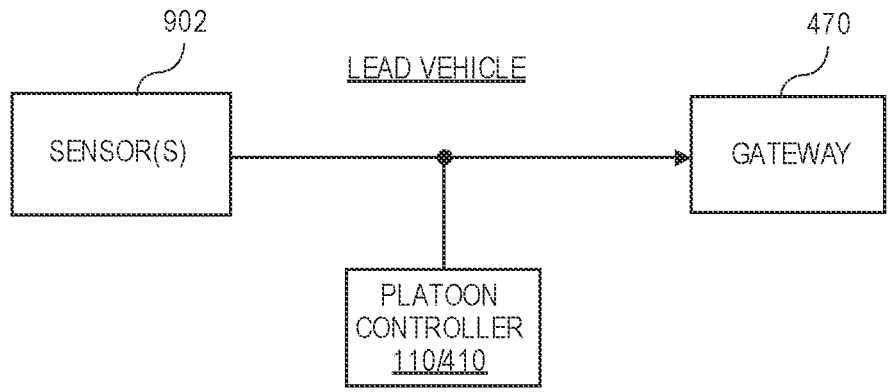
Figure 9C:
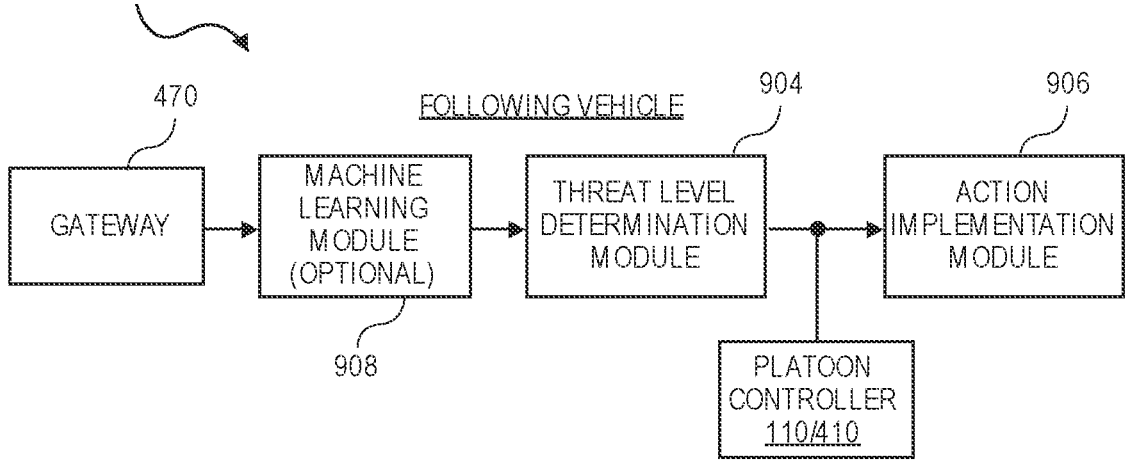

Referring to FIGS. 9A-9C, a set of block diagrams illustrating a first embodiment of a risk mitigation or avoidance system 900 is illustrated. In this embodiment, the processing of the sensor data collected on the lead vehicle 802 is mostly performed by the following vehicle 804.

As illustrated in FIG. 9A, the lead vehicle 802 generates and collects the data from the sensor(s) and then transmits or relays the data in raw or generally non-processed form to the following vehicle 804. In response, the following vehicle 804 perceives from the data the environment in the space 810 ahead of the lead vehicle 802, including the presence of an obstacle 806 that may represent a hazard. If a hazard is detected, one of a plurality of tiered severity threat levels is selected, depending on the severity of the hazard created by the obstacle 806. The following vehicle then implements one or more preemptive actions, as dictated by the selected severity threat level, to avoid or mitigate the risks created by the object.

In FIG. 9B, a block diagram of the modules provided in the lead vehicle 802 for generating, collecting and relaying the data to the following vehicle 804 is illustrated. In particular, the lead vehicle 802 includes one or more sensor(s) 902, a platoon controller, such as the controllers 110 and/or 410 as described above, and the gateway 470 for transmitting or relaying the data to the following vehicle 804.

As the lead vehicle 802 travels down the road surface, the sensor(s) 902 interrogate the space 810, detecting any object(s) 806. The data from the sensor(s) 902, which can be used to perceive the environment within the space 810, is then transmitted to the following vehicle 804 via the gateway 470.

In various embodiments, the sensor(s) 902 may include one or more of a radar detection system, a Lidar or laser detection system, a camera or imaging system, a radio system, an automated braking system, an automated collision avoidance system, a GPS system, a cruise control system, or any other type of passive sensor (e.g., a sensor that does not transmit signals but rather is required to perform a measurement, such as a camera) or active sensors such similar radar, Lidar and/or ultrasound, or any combination thereof. In addition, the sensor(s) 902 also includes "sensors' that require some type of hardware on the senses object, such as ultra-wideband, where an antenna is needed on the sensed vehicle. As each of these types of sensor(s) and their use on vehicles is well known, a further description is not provided herein for the sake of brevity.

The sensors 902 do not necessarily have to be physically provided on the lead vehicle 802. In alternative embodiments, the sensors 902 can also be various types of road-side sensors, such as but not limited to a camera, a traffic speed monitor or camera, a precipitation monitor, a temperature monitor, a wind sensor, a humidity sensor, a traffic monitoring sensor, or an in-ground sensor. As such, the term "sensor" as used herein should be broadly construed and is intended to mean both sensors onboard a vehicle, road-side sensors, or possibly a combination of both.

Referring to FIG. 9C, a diagram illustrating the modules for receiving, processing and implementing preemptive action(s) on the following vehicle 804 are illustrated. The following vehicle 804 includes a gateway 470 for receiving the data transmitted by lead vehicle 802, a threat level determination module 904, an action implementation module 906, platoon controller 110 and/or 410, and optionally a machine learning module 908.

As described above, the platoon controller 110 and/or 410 on the following vehicle 804 operates to maintain the gap 808 with the lead vehicle. As the platoon travels down the road surface, the module 904 processes the data received over the gateway 470. From the data, the module 904 can perceive the environment in the space 810 ahead of the lead truck 802 and ascertain any possible hazards created by one or more objects 806 that may be detected.

In the event any detected object(s) 806 represent a threat, then in accordance with a non-exclusive embodiment, the module 904 may select one of a plurality of tiered severity threat level thresholds or thresholds, each defining one or more corresponding preemptive action(s) respectively. In other words, the module 904 selects an appropriate one of the tiered threat levels commensurate with the severity of the threat represented by a perceived object 806.

The action implementation module 906 operates in cooperation with the threat level determination module 904. The module 906 is responsible for implementing specific preemptive action(s) that correspond to the selected severity threat level, as determined by the module 904, to mitigate or avoid the risks resulting from the object 806 in the space 810. Such preemptive action(s) may include, but are not limited to, broad categories such warnings and/or alerts, certain precautionary preparations in anticipation of a possible collision, and other specific actions.

In optional embodiments, machine learning module 908 operates in cooperation with the threat level determination module 904 to identify objects 806 and ascertain the threat level they may represent. Machine learning module 908 provides the ability to predict, learn and identify particular object(s) 806 that may be perceived in the field 810. For instance, module 908 may rely on image or pattern recognition and computational learning, artificial intelligence, along with data analytics and algorithms, to distinguish different types of objects (e.g., cars, buses, trucks, pedestrians, etc., and the particulars regarding each). Using image recognition, learning module 908 may be able to differentiate one type of vehicle versus another, whether or not a vehicle is moving or stationary (e.g., stalled on the road or moving), the direction a vehicle is travelling from the color of detected lights (e.g., white light from headlights indicates the vehicle is traveling in the oncoming direction, whereas red or brake lights indicates the vehicle is traveling in the same direction), road debris, pedestrians, etc. By recognizing or defining an object 806, the level determination module 904 can make a more accurate assessment of the perceived threat. If the object ahead is identified as a pedestrian, then the selected threat level is likely to be at an emergency level, meaning immediate preemptive action is required to avoiding running over the person. On the other hand if the object 806 is identified as road debris, such as a tire tread, then the selected threat level will likely be pre-warning or a non-emergency (i.e., a low threat), and the preemptive action will likely be a mere warning.

Figure 10A:
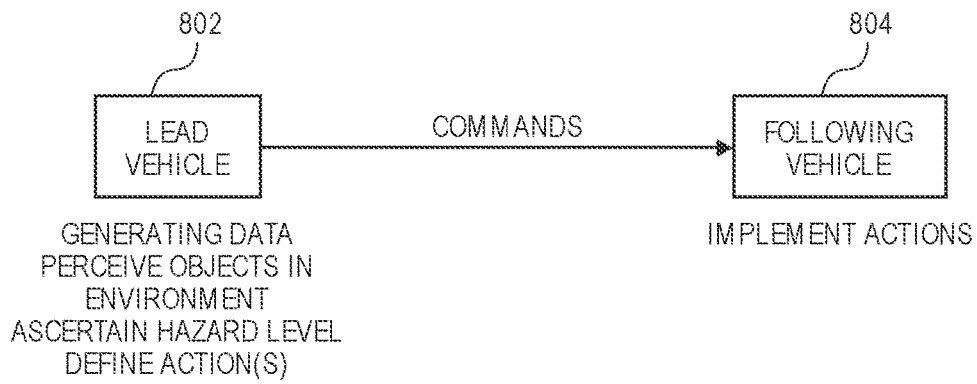
FIGS. 10A-10C are another set of block diagrams illustrating another non-exclusive embodiment of a system for mitigating or avoiding risks due to hazards encountered by connected vehicles in accordance with the present invention.
Figure 10B:
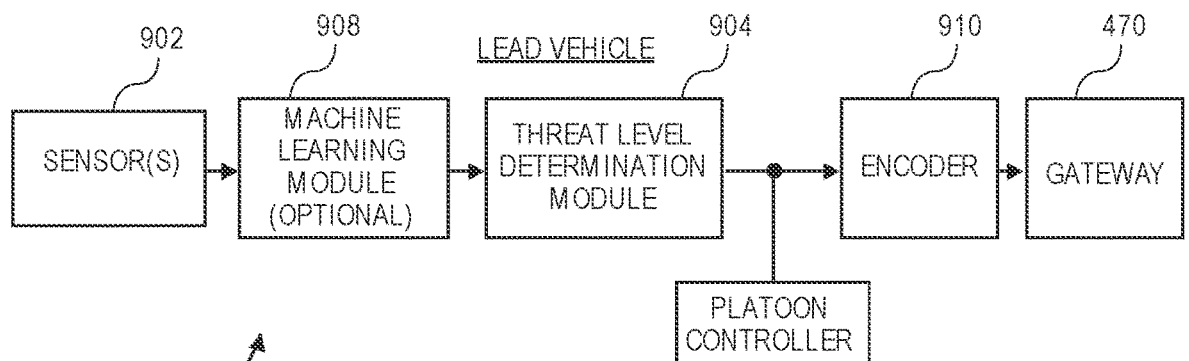
Figure 10C:
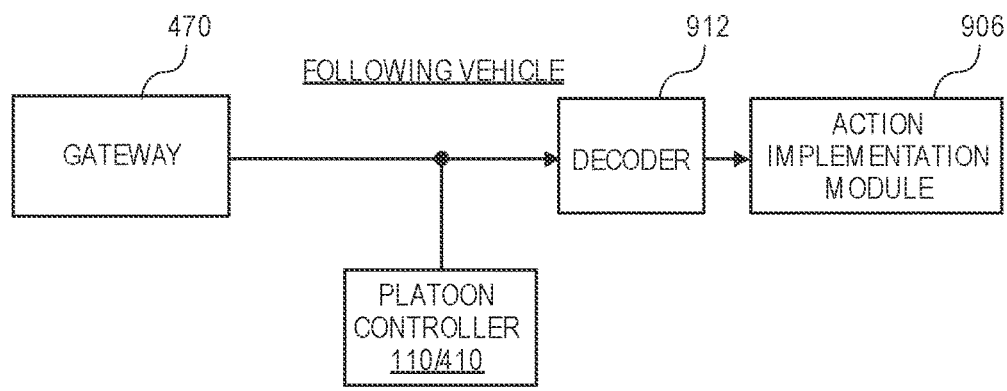

Referring to FIGS. 10A-10C, a set of block diagrams illustrating a second embodiment of a risk mitigation or avoidance system 1000 is illustrated. In this embodiment, the processing of the sensor data collected on the lead vehicle 802 is mostly performed by the following vehicle 804.

As illustrated in FIG. 10A, the lead vehicle 802 is responsible for (1) generating the data from the one or more sensor(s) 902, (2) perceiving if the environment in space 810 ahead of lead vehicle 802 includes any object(s) 806, (3) ascertaining any threat created by the object(s) 806 and (4) selecting an appropriate tiered threat level threshold that is commensurate with the severity of the threat represented by an object(s) 806. In addition, the lead vehicle 802 generates and sends coded commands to the following vehicle 804 that are indicative of the preemptive actions to be taken as dictated by the selected severity level.

FIG. 10B illustrates the modules for generating and processing the data from the sensor(s) 902 on the leading vehicle 802. Specifically, the lead vehicle 802 includes sensor(s) 902, threat level detection module 904, platoon controller 110 and/or 410, optionally machine learning module 908, and gateway 470. As each of these modules has been previously discussed, another description is not repeated herein for the sake of brevity. In addition, the leading vehicle 802 includes an encoder module 910, which is responsible for encoding any preemptive action(s) defined by the module 904. The gateway 470 then transmits the encoded command signal(s) to the following vehicle 804.

FIG. 10C illustrates the modules for receiving and processing the command(s) on the following vehicle 804. The modules include gateway 407 for receiving the command(s), a platoon controller 110 and/or 410, a decoder 912, and action implementation module 906. During use, the received command(s) are decoded by module 912 and provided to the module 906. In response to the command(s), module 906 implements the defined preemptive action.

In either of the above embodiments, the threat level detection module 904 is responsible for selecting one of a plurality of tiered threat levels or thresholds depending on the severity of the perceive threat. By way of example, a non-exclusive embodiment with four tiers is described below. In alternative embodiments, the number of tiers may significantly vary from a few too many. As such, the specific tiers and the corresponding preemptive actions as discussed below are exemplary and should not be construed as limiting in any regard.

Referring to FIG. 11, a table including four severity threat levels is illustrated in accordance with a non-exclusive embodiment of the invention. In this particular embodiment, the four severity levels include:

(1) Pre-warning threat,
(2) Moderate security threat,
(3) High security threat, and
(4) Emergency security threat.

The table also includes three columns, each defining a category of preemptive actions. The three categories in this example include:

(1) Warning(s) and/or Alerts,
(2) Safety precautions in anticipation of a collision, and
(3) Specific actions.

Referring to FIG. 12, corresponding preemptive actions for each of the three categories are listed. The corresponding preemptive actions for each category include:

Warning(s)/Alert(s): flashing or operating warning lights on the following vehicle, operating a horn on the following vehicle, operating visual warnings on the following vehicle, operating haptic actuators on the following vehicle and/or manipulating a radio on the following vehicle.

Safety Preparations: for braking (e.g., pre-pressurizing pneumatic brakes), and/or pre-tensioning seat belt(s).

Specific Actions: braking, steering, engine braking or retarding, transmission gear shifts, adjusting throttle or torque requests, spoiler adjustments, and/or differential steering.

Referring again to the table of FIG. 11, the checkmarks indicate which category of preemptive action is available for each severity level threshold in accordance with this embodiment. Specifically:

Pre-warning or low security threat level: Warnings/Alerts and Safety Preparations are available.

Moderate security level: Specific Actions.

High security: Safety Preparations and Specific Actions.

Emergency level: all three categories are available.

It should be understood that in any given circumstance, the threat level determination module 904 may select any one or combination of preemptive actions available in a given category once a threat severity level is defined. Typically, all of the preemptive actions in a given category will not be selected. However, in certain circumstances, they all may be selected. It suffices to say that the module 904 has the ability to pick and chose the preemptive actions in a given category on a case-by-case basis, depending on the totality of the circumstances represented by a given threat.

Figure 13:
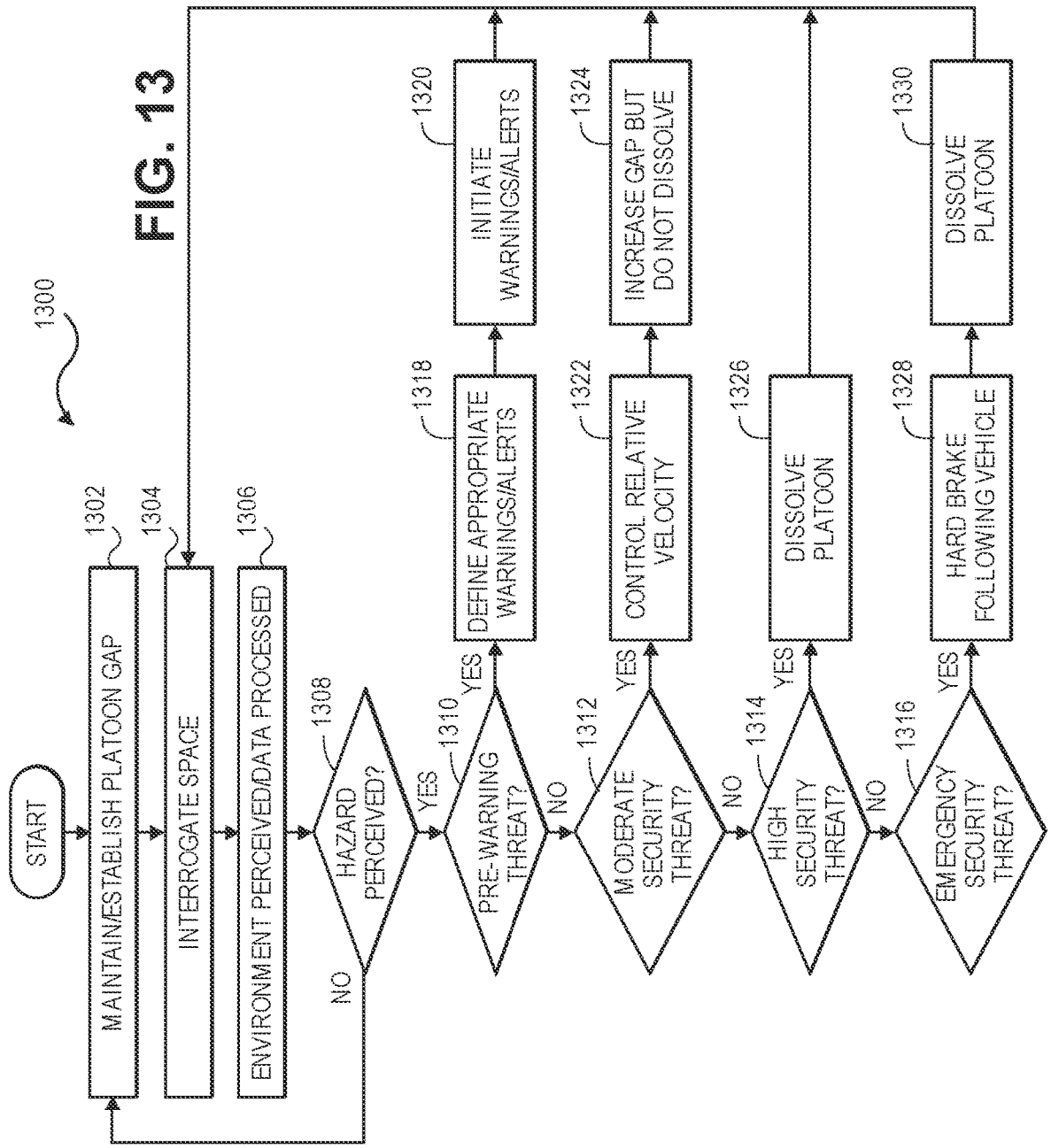
FIG. 13 illustrates a flow chart illustrating operational steps in accordance with a non-exclusive embodiment of the present invention.

Referring to FIG. 13, a flow chart 1300 illustrating operational steps of a non-exclusive embodiment of the risk mitigation or avoidance system 900/1000 is illustrated. With this particular embodiment, the preemptive action(s) taken by the following vehicle for each tier include:

(1) Pre-warning level: Warning and/or alert preemptive actions are taken, but the platoon remains intact,
(2) Moderate level: The gap 808 is increased, but the platoon remains intact;
(3) High security level: The platoon is dissolved; and
(4) Emergency level: Hard braking by following vehicle (s) 804 and the platoon is dissolved.

In the initial step 1302, the platoon controller 110/410 of two (or more) vehicles coordinate to establish a platoon as described herein.

In step 1304, the one or more sensor(s) 902 on the lead vehicle interrogate the space 810.

In step 1304, the environment in space 810, as perceived by processing the data generated by the sensor(s) 902, is analyzed. As previously discussed, the data can be processed by either the following vehicle 804, the lead 802 vehicle or even possibly by a combination of both (or more vehicles) in the platoon.

In decision 1308, a determination is made if there is a perceived hazard or not.

If not, then steps 1302 through 1306 are continually repeated so long as the platoon is maintained.

On the other hand, if a threat is perceived, for example because a threatening object 806 is identified in the space 810, then the threat level determination module 904 (either in the lead or following vehicle) selects the appropriate tiered severity threat level commensurate with the perceived threat. In this example, the severity levels include low (1310), moderate (1312), high (1314) and emergency (1316).

If the low security threat 1310 is selected, then module 904 defines the appropriate warnings and/or alerts in step 1318 and the action implementation module 906 implements those warnings and/or alerts in step 1320 in the lead vehicle 802 and/or the following vehicle 804.

If the moderate security level 1312 is selected, then the modules 904 and 906 cooperate to control the velocity of the platooning vehicles (i.e., reduce the velocity of the following vehicle(s)) relative to the lead vehicle for the purpose of increasing the gap as provided in steps 1322 and 1324 respectively.

If the high security threat 1314 is selected, then the modules 904 and 906 cooperate to dissolve the platoon in a controlled manner as provided in step 1326. For example, the relative velocity of the following vehicle is reduced, allowing the gap 808 to grow until the platoon is dissolved.

If the emergency security threat 1316 is selected, then the modules 904 and 906 cooperate to first hard brake the following vehicle(s) in step 1328 and then dissolve the platoon in step 1330. If multiple following vehicles 804 are involved, it is preferred that the timing of the hard braking occur in sequence, starting from the last vehicle to the lead vehicle.

Regardless of the tiered security level selected, control is returned to decision 1308. If the perceived hazard remains, then one of the security levels 1310-1316, and their subsequent actions, is performed until the threat is no longer present and/or the platoon is dissolved. If the threat is no longer present, then control is returned to step 1302, and normal platooning proceeds. If the platoon was dissolved as a result of a preemptive action, then the vehicles may decide to re-engage as described above once the threat has passed.

Examples

To better explain the operation of the systems 900/1000 for mitigating or avoiding risks encountered by platooning vehicles, several real world examples are provided and discussed below. In this example, the sensor(s) 902 on the lead vehicle are radar detectors capable of detecting or ascertaining the size and relative velocity of object(s) 806 in space 810. Based on the size and relative velocity, the threat level determination module, optionally along with machine learning module 908, can identify object(s) 806 and the threat they may represent. Again, the present invention is not limited to using radar sensors. As noted above, a number of different types of sensors can be used, either alone or in combination. For example, radar can be used in cooperation with cameras. The radar can be used to identify the size and relative velocity of object(s) 806 with respect to the lead vehicle, whereas images of the object(s) 806 can be used by learning module 908 to precisely identify the objects.

Scenario One: In this example, a car enters onto a freeway via an on ramp 50 meters ahead of a platoon of vehicles. Both the entering car and the platoon are traveling at approximately the same highway speed. Since 50 meters is generally considered a safe distance, and all involved vehicles are traveling at approximately the same speed, any perceived threat will be low. As a result, simply warning and/or alerting the platoon drivers and any other surrounding drivers, is an adequate response commensurate with the relatively low threat. As a result, the warnings alerts, such flashing warning lights, vibrating the seats of the platooning drivers, setting off an audio warning, are typically sufficient preemptive actions.

Scenario Two: In this scenario, the same car enters the freeway 50 meters ahead of the platoon. However, rather than traveling at highway speed, the car is traveling only at 45 mph, or approximately 20 mph slower than the platoon. As a result, the severity level is moderate, meaning a collision is not imminent, but the lead vehicle of the platoon should react (e.g., switch lanes and/or brake) action to avoid a possible collision. In this situation, the gap is increased without dissolving the platoon. For example, the gap can be increased from a normal operating condition of 12 meters to 24 meters by reducing the velocity of the following vehicle(s). As the relative velocity of the following vehicle is reduced and the gap grows, the lead vehicle can then take precautionary action to avoid the car ahead. If braking is needed, the likelihood of the following vehicle 804 colliding with the lead vehicle 802 is greatly diminished with a larger gap. When the car ahead speeds up, and the perceived threat is diminished, then platoon controllers 110/410 on the following vehicle can increase relative speed to reduce the gap to a normal operating distance (e.g., 12 meters).

Scenario Three: A car abruptly cuts off the platoon entering space 810 immediately ahead of the lead vehicle. In this scenario, the platoon is now dangerously tail-gating the car ahead, which represents a high security threat if the car ahead suddenly brakes. In response, the system acts to dissolve the platoon, again by first braking or otherwise reducing the velocity of the following vehicle(s) versus the lead vehicle. Once the velocity of the following vehicle(s) is reduced, then the lead vehicle can brake or otherwise reduce its velocity. Since the following vehicle started reducing its velocity sooner, it will slow down quicker relative to the lead vehicle. As a result, the gap will widen until the platoon is dissolved.

Scenario Four: A platoon crests a hill on a freeway and immediately sees stalled cars ahead and quick braking is required to avoid a collision. In this emergency scenario, the following vehicle immediately initiates hard braking (e.g., a Brake Now command), reducing its relative velocity with respect to the lead vehicle and growing the gap and dissolving the platoon. Once the following vehicle reduces its velocity, then the lead vehicle can brake and take other preemptive steps to reduce its velocity. Again, since following vehicle started slowing down first, the gap will increase as the two vehicles reduce their velocity.

In the various scenarios above, there are a number of situations where the following vehicle is required to reduce velocity prior to the lead vehicle doing the same. The Applicant has found that by initiating reduced velocity of the following vehicle just a split second (e.g., a half second or less) ahead of the lead vehicle results in the size of the gap growing larger as both vehicles decelerate.

In various embodiments, the relative velocity between the two vehicles can also be precisely controlled when either widening or dissolving the gap. For example, the rate of velocity reduction of the following vehicle may range from (−0.1 to −2.0) meters per second relative to the lead vehicle. In situations where there are multiple following vehicles in a platoon, the velocity reduction per vehicle can be successively incremented depending on vehicle position in the platoon. For instance, the velocity rate reduction for the second, third and fourth vehicles can be incremented (−0.2, −0.4 and −0.6) meters per second respectively. By sequentially controlling the timing (i.e., initiating braking from the back to the front vehicle) and increasing the negative rate of velocity from the back vehicle to the forward vehicle, the gap between each vehicle can be widened or dissolved in a controlled manner.

Alternative Embodiments

It should also be understood that the above embodiments of the risk mitigation and avoidance system 900/1000 are merely illustrative and should by no means be construed as limiting.

For example, any number of severity threat levels or thresholds may be used and the number, type and/or specific preemptive actions per category may widely vary. The above examples of four threat severity levels, and the specific preemptive actions listed for each of the three categories, should therefore not be construed as limiting in any manner. Any number of severity levels, categories and preemptive actions may be used.

In addition, it should be understood that while much of the discussion above was provided in the context of a platoon including only two vehicles, again this should not be construed as a limitation of any kind. On the contrary, the gap control and risk mitigation or avoidance, as described herein, is applicable to platooning involving any number of vehicles, regardless of vehicle type.

In yet other embodiments, the vehicles involved platooning and/or and risk mitigation or avoidance can be autonomous, semi-autonomous, or driven by a driver, or any combination thereof.

Pre-Cognitive Braking

Pre-cognitive braking is one particular pre-emptive action that can be used to mitigate or avoid risks due to hazards encountered by platooning vehicles. With pre-cognitive braking, when a lead vehicle 802 issues a brake command, the following vehicle(s) 804 is/are immediately informed, so that the following vehicle(s) 804 can take preemptive action, preferably before a change in speed of the front vehicle 802 occurs.

Figure 14:
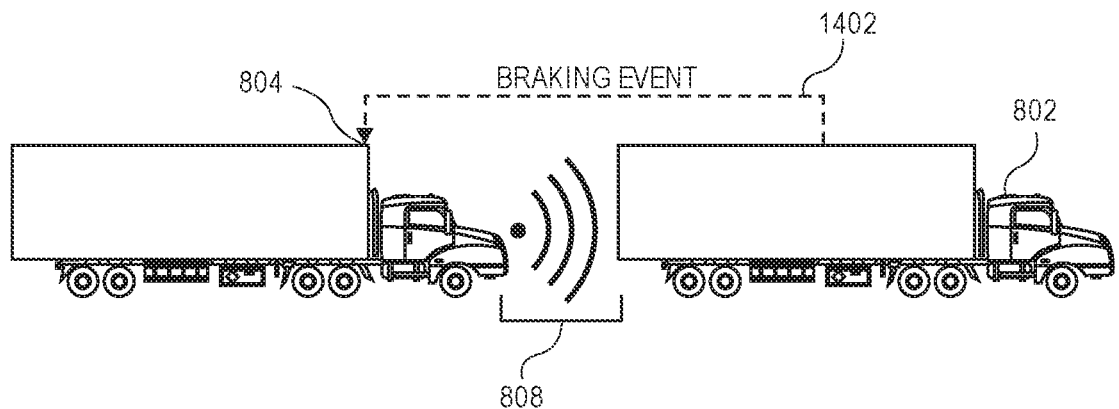
FIG. 14 illustrates two vehicles operating in a platoon in accordance with the present invention.

Referring to FIG. 14, a pair of vehicles 802, 804 operating in a platoon with a gap 808 is illustrated. In this example, the lead vehicle 802 initiates a braking command. In various embodiments, the braking action can be implemented or may result in a number of ways, such as but not limited to, the driver braking (i.e., pushing the brake pedal), an active cruise control system (ACC) initiating a braking action, or some other automated driving unit initiating the braking action. Regardless of the origin, a braking notice 1402 of the braking command is transmitted by the lead vehicle 802 to the following vehicle 804. With the following vehicle 804 aware of the braking event, the braking action of the two vehicles can be coordinated, avoiding or mitigating risks.

The notice information associated with the braking event 1402 sent from the lead vehicle 802 to the following vehicle 804 may widely vary. In different embodiments, the relayed information may include a simple brake command to more detailed information, such as brake application pressure, brake air supply reservoir pressure, engine torque, engine speed or RPMs, compression (Jake) brake application, accelerator pedal position, engine manifold air pressure (MAP), computed delivery torque, vehicle speed, system faults, battery voltage, radar or lidar data, or any combination thereof. Also, it should be understood that other information besides braking commands may be sent between the vehicles 802, 804. As a general rule, braking information is prioritized over types of non-critical information.

The information pertaining to the braking event 1402, as relayed via a data link established by the gateways 470 of the lead vehicle 802 and the following vehicle 804. In various embodiments, the data link may be implemented using WiFi, one or more designated radio channels, Zigbee or any industry or agreed upon standard radio. The above list is merely exemplary. Any reliable, low latency data link may be used, having for instance, a latency of 10 milliseconds or less.

Pre-cognitive braking involves, as referred to above, the coordinated braking action between the lead vehicle 802 and the following vehicle 804. In some embodiments, the coordinated action involves initiating the braking of the following vehicle 804 before the lead vehicle. In this way, the gap between the two vehicles grows and the two (or more vehicles) may each brake in a controlled, safe manner.

Figure 15:
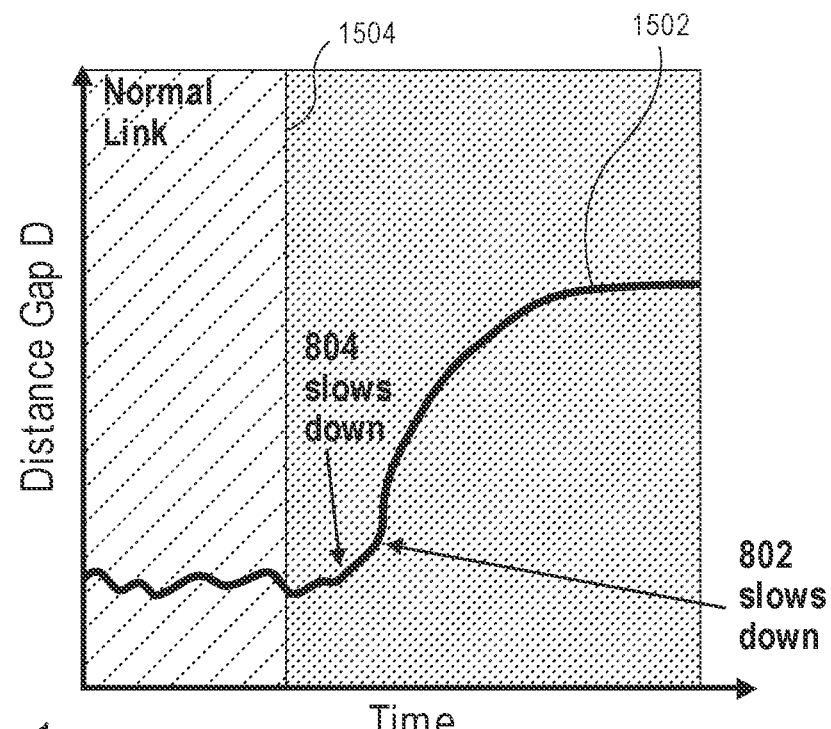
FIG. 15 illustrates a plot showing a gap between two platooning vehicles during pre-cognitive braking in accordance with a non-exclusive embodiment of the invention.

Referring to FIG. 15, a diagram 1500 that plots the distance "D" of the gap 808 between the two vehicles over time while platooning is illustrated. Prior to a braking event by the lead vehicle 802, designated by 1502 in the plot, the gap distance D remains fairly constant, fluctuating only slightly as corrective action is taken by the vehicles to maintain the desired gap. When the braking action 1502 occurs, the following vehicle 804 is immediately notified via the data link. In this particular embodiment, the braking of the two vehicles is coordinated such that the following vehicle 804 brakes (i.e., slows down) first before the lead vehicle 802. As a result, the gap grows as illustrated by the rise in the plot 808 after braking is initiated.

It should be understood that the aforementioned embodiment illustrated above is merely illustrative and should be in no way construed as limiting. In various alternative implementations, the braking behavior of the two vehicles can be controlled in a variety of ways. For instance, the two vehicles can begin braking at substantially the same time, but with the following vehicle braking harder than the lead vehicle. As a result, the rate at which the gap grows over time is increased as the following vehicle reduces its speed at a quicker rate. This is just one possible alternative. Many other braking strategies, as discussed in more detail below, may be used.

Figure 16:
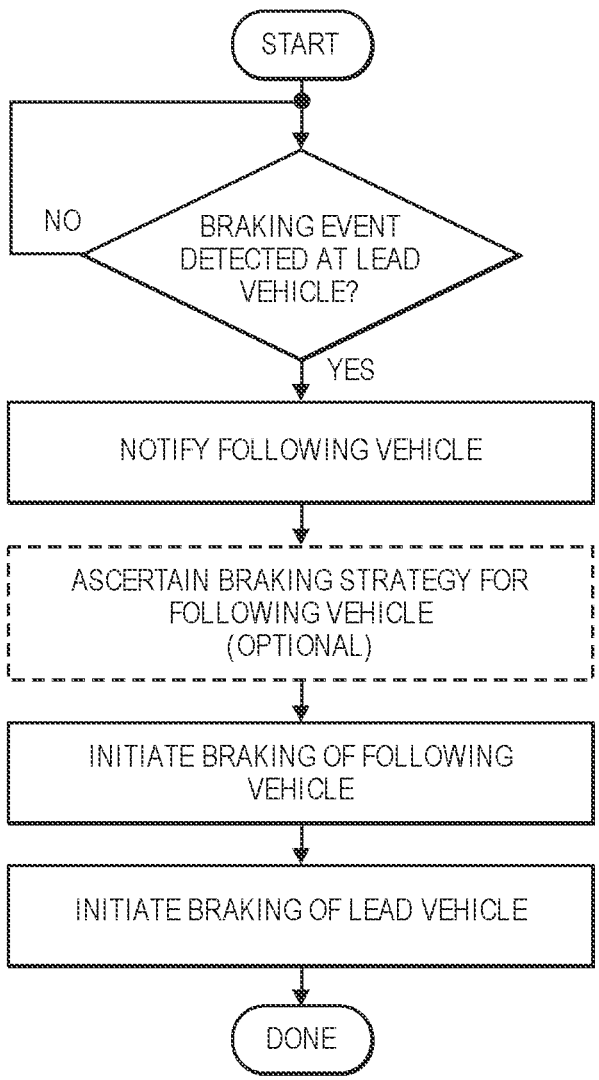
FIG. 16 illustrates a flow chart detailing steps for implementing pre-cognitive braking in accordance with the a non-exclusive embodiment of the invention.

Referring to FIG. 16, a flow chart 1600 illustrating the steps of pre-cognitive braking are illustrated.

In the initial step 1602, events are monitored at the lead vehicle 802 to determine if a braking event has occurred. Again, as discussed above, a braking event may be detected in a number of ways and is not necessarily limited to the driver pushing the brake pedal. For instance, the braking event can be triggered by an active cruise control system (ACC) or some other automated driving unit initiating the braking action.

In step 1604, a notice of the detected braking event is communicated to the following vehicle 804. The communication may take place over the communication link established between the gateways 407 of the two vehicles. In various embodiments, the communication includes a brake command along with possibly other information, such as brake application pressure, brake air supply reservoir pressure, engine torque, engine speed or RPMs, compression (Jake) brake application, accelerator pedal position, engine manifold air pressure (MAP), computed delivery torque, vehicle speed, system faults, battery voltage, radar or lidar data, or any combination thereof.

In optional step 1606, the following vehicle may implement a number of braking strategies. For instance, the braking at following vehicle may be timed to occur a few moments before the braking action of the lead vehicle. Alternatively, or in addition, the following vehicle may be controlled to reduce vehicle speed at a controlled rate that is more significant than the lead vehicle. As a result, the gap will widen as the two vehicles reduce their speed.

Heavy vehicles, such as trucks or busses, typically rely on pneumatic or air brakes. These types of brakes use compressed air in a chamber, pressing on a piston, to apply pressure on to a brake pad that is used to brake or stop the vehicle. When braking while driving, the driver typically pushes the brake pedal, which forces air under pressure into the chamber, causing the piston to apply pressure to the brake, slowing the vehicle. With pneumatic brakes, the braking action may be delayed until there is adequate air pressure in the chamber.

In one non-exclusive braking strategy, the following vehicle 804 may in response to a received braking notice 1402 begin to immediately pressurize its brake chamber(s) ahead of and/or more aggressively than the lead vehicle 802. As a result, the brakes may be applied by the following vehicle 804 before the lead vehicle 802.

In yet other alternative embodiments, one or any combination of the above-listed parameters may be used to formulate a braking strategy for the following vehicle 804. With this information, the rate of braking of the following vehicle 804 can be calculated relative to the lead vehicle 802. For example, the velocity reduction of the following vehicle 804 may be controlled to be (−0.1 to −2.0) meters per second relative to the lead vehicle 802.

In step 1608, the braking, including the use of any particular braking strategy, occurs with the following vehicle.

In step 1610, the braking, including the use of any particular braking strategy, occurs with the lead vehicle after braking is initiated with the following vehicle in the previous step.

Finally, the type of vehicles that may be used for platooning and/or risk mitigation or avoidance may widely vary and are not limited to exclusively trucks. On the contrary, the present invention contemplates that any vehicle class or type may be used, regardless if powered by a combustion engine, electric motor, fuel cells, or any other possible self-propulsion mechanism, including cars, trucks, buses, motorcycles, or any other self-propelled vehicle that is currently or may be developed in the future.

Therefore, the present embodiments should be considered illustrative and not restrictive and the invention is not to be limited to the details given herein, but may be modified within the scope and equivalents of the appended claims.

What is claimed is:

1. A vehicle system for use on a following vehicle when the following vehicle is behind a lead vehicle in a platoon, the vehicle system on the following vehicle comprising:
   a receiver configured to receive data generated by sensors on the lead vehicle; and
   a controller configured to ascertain a hazard in a space adjacent the lead vehicle from the data generated by sensors on the lead vehicle, wherein the controller is configured to dissolve the platoon in response to ascertaining the hazard in the space adjacent the lead vehicle.

2. The vehicle system of claim 1, wherein the platoon is dissolved by reducing velocity of the following vehicle relative to the lead vehicle.

3. The vehicle system of claim 2, wherein the reduction of velocity of the following vehicle is initiated before any preemptive action taken by the lead vehicle in response to the hazard.

4. The vehicle system of claim 1, wherein the controller is further configured to reduce velocity of the following vehicle relative to the lead vehicle as a response to the ascertained hazard, wherein the reduced velocity ranges from −0.1 to −2.0 meters per second relative to the lead vehicle.

5. The vehicle system of claim 1, wherein the lead vehicle and the following vehicle are both tractor-trailer trucks.

6. A method of at least partially controlling a following vehicle when the following vehicle is behind a lead vehicle in a platoon, the method comprising:
   receiving, at a following vehicle receiver, data generated by sensors on the lead vehicle;
   ascertaining, at a following vehicle controller, a hazard in a space adjacent the lead vehicle from the data generated by sensors on the lead vehicle; and
   dissolving, by the following vehicle controller, the platoon in response to ascertaining the hazard in the space adjacent the lead vehicle.

7. The method of claim 6, wherein the platoon is dissolved by reducing velocity of the following vehicle relative to the lead vehicle.

8. The method of claim 7, wherein the reduction of velocity of the following vehicle is initiated before any preemptive action taken by the lead vehicle in response to the hazard.

9. The method of claim 6, further comprising reducing velocity of the following vehicle relative to the lead vehicle in response to the ascertained hazard, wherein the reduced velocity ranges from −0.1 to −2.0 meters per second relative to the lead vehicle.

10. The method of claim 6, wherein the lead vehicle and the following vehicle are both tractor-trailer trucks.

11. A method of at least partially controlling a following vehicle when the following vehicle is behind a lead vehicle in a platoon, the method comprising:
    receiving, at a following vehicle receiver, data generated by sensors on the lead vehicle indicative of a scene located adjacent the lead vehicle;
    ascertaining, at a following vehicle controller, a hazard in a space adjacent the lead vehicle from the data generated by sensors on the lead vehicle;
    determining, at a following vehicle controller, that the ascertained hazard crosses a predetermined severity threshold; and
    initiating a preemptive action, by the following vehicle controller, in response to the determination that the severity threshold has been crossed.

12. The method of claim 11, wherein the preemptive action includes dissolving the platoon by reducing velocity of the following vehicle relative to the lead vehicle.

13. The method of claim 12, wherein the reduction of velocity of the following vehicle is initiated before any preemptive action taken by the lead vehicle in response to the determination that the severity threshold has been crossed.

14. The method of claim 11, wherein the preemptive action includes reducing velocity of the following vehicle relative to the lead vehicle in response to the ascertained hazard, wherein the reduced velocity ranges from −0.1 to −2.0 meters per second relative to the lead vehicle.

15. The method of claim 11, wherein:
   while operating in the platoon, a gap is maintained between the lead vehicle and the following vehicle; and
   the preemptive action includes increasing a gap between the lead vehicle and the following vehicle without dissolving the platoon.

16. The method of claim 11, wherein the lead vehicle and the following vehicle are both tractor-trailer trucks.

17. The method of claim 11, wherein the preemptive action includes one or more of the following:
   reducing velocity of the following vehicle relative to the lead vehicle;
   increasing a platoon gap between the lead vehicle and the following vehicle;
   dissolving the platoon; and/or
   activating one or more warnings or alerts.

18. The method of claim 11, wherein the sensed information is generated by:
   (a) a radar unit,
   (b) a LIDAR unit,
   (c) a camera; or
   (d) any combination of (a) through (c).

* * * * *